(12) United States Patent
Satoh et al.

(10) Patent No.: US 7,835,767 B2
(45) Date of Patent: Nov. 16, 2010

(54) MOBILE TERMINAL

(75) Inventors: Kazutaka Satoh, Sapporo (JP); Takeshi Uchiumi, Sapporo (JP); Miwa Akagi, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 554 days.

(21) Appl. No.: 11/822,298

(22) Filed: Jul. 3, 2007

(65) Prior Publication Data

US 2007/0254657 A1 Nov. 1, 2007

Related U.S. Application Data

(63) Continuation of application No. PCT/JP2005/001265, filed on Jan. 28, 2005.

(51) Int. Cl.
*H04B 1/38* (2006.01)
*H04M 1/00* (2006.01)

(52) U.S. Cl. ........... 455/556.1; 455/552.1; 455/41.3; 455/574

(58) Field of Classification Search ........... 455/3.01, 455/420, 434, 41.2, 41.1, 41.3, 552.1, 556.1, 455/557, 569.1, 574, 550.1; 370/337, 445
See application file for complete search history.

(56) References Cited

U.S. PATENT DOCUMENTS

| 7,475,244 B2 | 1/2009 | Sugikawa |
| 2002/0016188 A1 | 2/2002 | Kashiwamura |
| 2003/0148760 A1 | 8/2003 | Takayanagi |
| 2004/0146031 A1* | 7/2004 | Jukarainen ........... 370/337 |
| 2005/0018706 A1* | 1/2005 | Myojo ........... 370/445 |
| 2006/0089119 A1* | 4/2006 | Lipasti et al. ........... 455/410 |

FOREIGN PATENT DOCUMENTS

| JP | 10-308697 A | 11/1998 |
| JP | 2000-101706 | 4/2000 |

(Continued)

OTHER PUBLICATIONS

Japanese Office Action issued on Apr. 14, 2009 in corresponding Japanese Patent Application 2007-500395.

*Primary Examiner*—John Lee
(74) *Attorney, Agent, or Firm*—Fujitsu Patent Center

(57) ABSTRACT

A wireless communications device 2 comprising a wireless control function unit 11, a Bluetooth control function unit 12, and a user interface unit 13, wherein the device has, as the Bluetooth, at least one of a (i) Hands-Free Profile, (ii) Dial-up Networking Profile/Personal Area Network Profile, and (iii) Generic Object Exchange Profile. This device 2 optimally implements the Bluetooth low-consumption mode in accordance with the contents of the profiles of the foregoing items (i) to (iii) in view of the system efficiency by (a) invalidating the low-consumption mode or (b) validating the low-consumption mode so as to reduce the number of data transmissions per unit time in the case of (i), make the time parameters of each of the Hold, Sniff, and Park modes variable or alternatively make the manner of implementation of the low-consumption mode variable depending on whether the channel of the data transmission is a dedicated physical channel or a common physical channel in the case of (ii), and shift to the low-consumption mode only in a single-data transfer mode and prohibit it in an all-data transfer mode in the case of (iii).

13 Claims, 19 Drawing Sheets

FOREIGN PATENT DOCUMENTS

| | | |
|---|---|---|
| JP | 2001-189689 | 7/2001 |
| JP | 2001-345756 | 12/2001 |
| JP | 2002-84361 | 3/2002 |
| JP | 2002-84575 | 3/2002 |
| JP | 2002-176487 A | 6/2002 |
| JP | 2003-37545 | 2/2003 |
| JP | 2003-174676 A | 6/2003 |
| JP | 2003-298493 | 10/2003 |
| JP | 2003-318807 | 11/2003 |
| WO | 01/99393 | 12/2001 |
| WO | 03/017596 A2 | 2/2003 |
| WO | 03/098363 A1 | 11/2003 |

* cited by examiner

FIG.13

| Rate | LC size | LC mode | TB size | TFS | TTI | PHY ch | APPLICATION | TRANSMISSION CYCLE | INTERVAL |
|---|---|---|---|---|---|---|---|---|---|
| 64kbps | 320 | AM | 336 | 0,1,2,4 | 20 | D | ○ | 500ms | 80ms |
| 128kbps | 320 | AM | 336 | 0,1,2,4,8 | 20 | D | ○ | 250ms | 40ms |
| 256kbps | 320 | AM | 336 | 0,1,2,4,8 | 10 | D | × | — | — |

MOBILE TERMINAL

CROSS-REFERENCE TO RELATED APPLICATION

This application is a continuation of PCT/JP2005/001265, filed on Jan. 28, 2005, the contents being incorporated therein by reference.

TECHNICAL FIELD

The present invention relates to a mobile terminal or gateway or other wireless communications device mounting Bluetooth, more particularly relates to a wireless communications device configured taking note of the "low-consumption mode" defined in the Bluetooth specifications.

BACKGROUND ART

In recent years, wireless communications devices mounting Bluetooth have been widely spreading. As such wireless communications devices mounting Bluetooth, there are the above-explained mobile phones and other mobile terminals and also dial-up routers and other wireless gateways.

Such Bluetooth mounting mobile terminals and wireless gateways generally often employ the "low-consumption mode" defined in the Bluetooth specifications. This low-consumption mode is generally applied when there is no longer any data to be transferred between (i) an above Bluetooth mounting mobile terminal or other wireless communications device and (ii) an opposing Bluetooth mounting device engaged, in close distance wireless communications by Bluetooth, with this (i). This is to reduce the power consumption of the battery built-in the wireless communications device and opposing device.

As an example of known art designed to reduce the battery power consumption, there is the following Patent Document 1 (wireless type transmitter/receiver set). Further, as an example of known art designed to reduce the battery power consumption in a Bluetooth mounting wireless communications device employing the low-consumption mode, there is the following Patent Document 2 (mobile station equipped with close distance wireless function and method of reduction of its power consumption).

The Bluetooth mounting wireless communications device according to the latter Patent Document 2 is partially common with the Bluetooth mounting wireless communications device according to the present invention in the point that their objects are lowering the power consumption, but the two differ in the means for achieving the object. The means according to Patent Document 2 is to prevent useless electric waves from being emitted. On the other hand, the means of the present invention, as explained in detail later, is to provide the optimum low-consumption mode in accordance with the characteristics of the provided service and does not remain only the means of preventing useless electric waves from being emitted. Accordingly, as explained later, there may be the situation where the low-consumption mode must not be shifted to may occur depending on the characteristics of the provided service.

[Patent Document 1] Japanese Patent Publication (A) No. 2002-84361
[Patent Document 2] Japanese Patent Publication (A) No. 2003-37545

DISCLOSURE OF THE INVENTION

Problems to be Solved by the Invention

As the above-explained "service", 10 or so representative ones have already been defined as Bluetooth profiles in the Bluetooth. Further, as profiles in which the low-consumption mode is frequently applied among these Bluetooth profiles, there are the following ones:

(i) Hands-Free Profile (hereinafter referred to as HFP), (ii) Dial-up Networking Profile (hereinafter referred to as DUNP) or Personal Area Network Profile (hereinafter referred to as PANP), and (iii) Generic Object Exchange Profile (hereinafter referred to as GOEP).

The present invention can apply means commonly to each of the profiles (services) of (i), (ii), and (iii) described above. The common ideas are not to apply the "low-consumption mode" in some cases and to enable change of the "time parameters" defined in the profiles in accordance with the communications conditions at that time.

Below, the problems in the above-described (i), (ii), and (iii) will be separately explained. For this purpose, an example of a wireless communications system to which the present invention can be applied is shown in FIG. 19.

In FIG. 19, a wireless communications system 1 is provided with a wireless communications device 2, an opposing device 3, and a third party device 4. The wireless communications device 2 at the center communicates with the opposing device 3 via a close distance wireless communications section (so-called R point) 5 on the one hand and communicates with the third party device 4 via a long distance wireless communications section (so-called U point) 6 on the other hand.

Note that, in the example of the figure, more specifically, the wireless communications device 2 is shown as a mobile terminal (mobile phone) 2M, the opposing device 3 thereof is shown as a personal computer (PC) 3P, and the third party device 4 thereof is shown as a base station 4B. The following explanation will be given taking as an example these 2M, 3P, and 4B, according to need, and the wireless communications device 2 may also be a wireless gateway in place of the mobile terminal 2M.

(i) In the Hands-Free Profile (HFP), the mobile terminal 2M notifies a reception level (for example dB value) of an electric wave from the long distance wireless communications section (U point) in a cellular or other corresponding wireless communications system, or a value converted to a number of antennas changing to for example 0 to 3 to enable easy visual understanding by the user, to the opposing device 3 via the close distance (Bluetooth) wireless communications section (R point) 5.

When making that notification, when the mobile terminal 2M has shifted to the low-consumption mode at the above-described R point, for notifying the reception level at the U point, it releases the low-consumption mode at the R point once, returns to the normal mode, then sends the reception level (or antenna number) information. Mobile terminals 2M have conventionally been equipped to send the reception level information to the opposing device 3 for each reception level measurement cycle, so when the fluctuation of the reception level at that R point (or the number of antennas) is large, the reception level information thereof will be frequently sent to the opposing device 3. Under this situation, the transmission/reception of data in the above-described low-consumption mode is inhibited, so the low-consumption mode release operation at the R point is frequently carried out. For this reason, there is the problem that the effect of the low-consumption mode at the R point is reduced.

On the other hand, in the relationship with the third party device 4, there are the following problems. Usually, a mobile terminal 2M intermittently receives signals from the third party device (base station 4B) for saving power. When engaging in such intermittent reception at the U point, the timing of that intermittent reception and the timing of transmission of the reception level information to the third party device 4 are controlled independently, therefore the effect of the low-consumption power control by that intermittent reception was sometimes reduced.

(ii) The Dial-up Networking Profile (DUMP)/Personal Area Network Profile (PANP) shifts to the low-consumption mode at the R point when the mobile terminal 2M (or data terminal (DT)) completes the processing of the data being sent/received. At this time, in the Bluetooth specifications, as explained above, data transmission/reception in the low-consumption mode is prohibited, therefore, when a new transmission data is generated, the low-consumption mode at the R point must be once released, the normal mode returned to, then the transmission of that data started. In this case, the shift to the low-consumption mode and its release were executed without consideration of the user rate at the U point.

From the low-consumption mode point of view, the time taken for the return depends upon the processing time of the mobile terminal 2M (or 3P) and the parameters of the low-consumption mode (Hold, Sniff, Park etc.), but when considering the case of transmission/reception at the U point at a high speed user rate, there is the problem that a long time is consumed for the return operation from the low-consumption mode, therefore the throughput of the data by the transmission/reception processing at that high speed user rate is not improved. At a user rate such as the middle speed/low speed rate where the throughput is important, but the low-consumption mode operation is also important, if in the case of the conventional system, there is also the problem that the same low-consumption parameters are used regardless of the user rate, and thus the optimum low-consumption mode is not performed.

(iii) In the Generic Object Exchange Profile (GOEP) as well, in the same way as the other profiles, the low-consumption mode control is frequently applied at the R point. The data handled in this GOEP is mainly stored numbers (memory dial), e-mails, pictures, etc. of a mobile terminal 2M, i.e., a mobile phone.

When sending/receiving such data, if sending/receiving one set of data, the time consumed for the release of the low-consumption mode does not become much of a problem. However, a mobile phone, i.e., the mobile terminal 2M, can store several hundreds of sets of data even for the stored numbers (memory dial), therefore if transferring all such data, the low-consumption mode will end up being shifted to each time the transmission data transfers, so a long time is taken for the release operation from the low-consumption mode. In the end, there is the problem that the transfer time of all of the data becomes extremely large.

Accordingly, in consideration of the above problems, an object of the present invention is to provide a wireless communications device able to optimize the execution of the low-consumption mode so that the system efficiency is improved under the various Bluetooth profiles in which the low-consumption mode is applied.

Means for Solving the Problems (i) A wireless communications device 2 including a Hands-Free Profile (HFP) as a Bluetooth profile, wherein a timing for transmitting reception level information of electric waves in long distance wireless communications at the U point (6 of FIG. 19) to the opposing device 3 is set so that the number of transmissions per unit time becomes small.

(ii) A wireless communications device 2 including a Dial-up Networking Profile (DUNP) or Personal Area Network Profile (PANP) as a Bluetooth profile wherein (a) whether to make the low-consumption mode valid or invalid is determined in accordance with the user rate when performing long distance wireless communications at the U point with the third party device 4 and (b) when making the low-consumption mode valid, further the time parameters in the corresponding mode (Hold, Sniff, or Park) are made changeable.

Alternatively, (a) when a call established in long distance wireless communications with the third party device 4 (6 of FIG. 19) uses a dedicated physical channel and the close distance wireless communications with the opposing device 3 (5 of FIG. 19) shifts to the low-consumption mode, this low-consumption mode is returned to the normal mode, while (b) when the above-explained established call uses a common physical channel, the low-consumption mode is shifted to immediately after the data being sent/received.

(iii) In a wireless communications device 2 using the Generic Object Exchange Profile (GOEP) as the Bluetooth profile, the shift to the low-consumption mode is started or prohibited in accordance with whether the data transfer with the opposing device 3 in the wireless communication device 2 is a single-data transfer mode having a small amount of data or an all-data transfer mode having a large amount of data.

BRIEF DESCRIPTION OF THE DRAWINGS

FIG. 13 is a view showing concrete examples of various types of parameters.

BEST MODE FOR CARRYING OUT THE INVENTION

Figure 1:
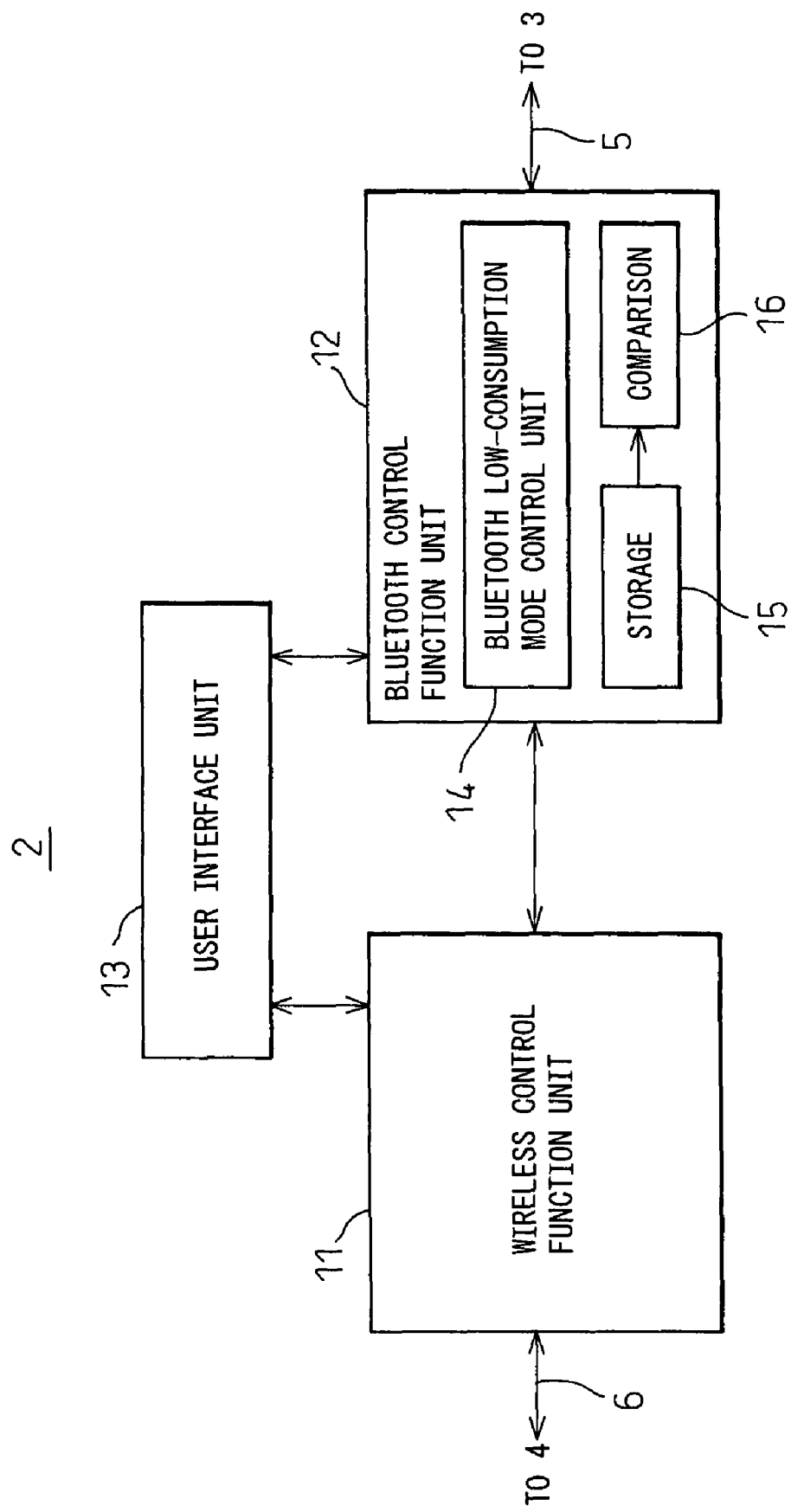
FIG. 1 is a view of the basic configuration of a wireless communications device according to the present invention.

FIG. 1 is a view of the basic configuration of a wireless communications device 2 according to the present invention. Note that the same reference numerals or symbols are attached to the same components throughout all of the drawings.

As shown in the figure, this wireless communications device 2 is, as a whole, provided with a wireless control function unit 11 for long distance wireless communications (6) with the third party device 4, a Bluetooth control function unit 12 for close distance wireless communications (5) by Bluetooth with the opposing device 3, and a user interface unit 13 linked with these wireless control function unit 11 and Bluetooth control function unit 12. Here, (i) the invention provides a wireless communications device 2 in which a Bluetooth control function unit 12 includes at least a Hands-Free Profile as a Bluetooth profile characterized in that this Bluetooth control function unit 12 includes a Bluetooth low-consumption mode control unit 14, and this Bluetooth low-consumption mode control unit 14 sets a timing for transmitting the reception level information of the electric wave in long distance wireless communications (6) to an opposing device 3 so that the number of transmissions per unit time becomes small.

Further, this is characterized in that, when the wireless control function unit 11 performs long distance wireless communications (6) with the third party device 4 by intermittent reception, the Bluetooth low-consumption mode control unit 14 sets the timing for transmitting the above-explained reception level information to the opposing device 3 so as to be synchronized with the timing of the intermittent reception.

Furthermore, this is characterized in that the Bluetooth low-consumption mode control unit 14 has a storing means 15 for storing the reception level information already transmitted previously and a comparing means 16 for comparing the reception level information to be transmitted this time and the stored reception level information and transmits the reception level information only when a change occurs between the two as a result of the comparison.

(ii) The invention provides a wireless communications device in which a Bluetooth control function unit 12 includes a Dial-up Networking Profile or a Personal Area Network Profile as Bluetooth profile characterized in that this Bluetooth control function unit 12 includes a Bluetooth low-consumption mode control unit 14 with either of a Hold mode, a Sniff mode, or a Park mode, and the Bluetooth low-consumption mode control unit 14 (a) determines whether to validate or invalidate the low-consumption mode in accordance with the user rate when performing the long distance wireless communications (6) with a third party device 4 and (b) when validating the low-consumption mode, further, makes the time parameters in the corresponding mode described above changeable.

Below, the concrete function will be explained for each of the above-described modes, that is, the modes of Hold, Sniff, and Park.

(Hold Mode)

When the Bluetooth control function unit 12 executes the Hold mode, the Bluetooth low-consumption mode control unit 14 sets the time parameters in (b) described above to a Hold time (T1 of FIG. 7) of this Hold mode.

(Sniff Mode)

When the Bluetooth control function unit 12 executes the Sniff mode, the Bluetooth low-consumption mode control unit 14 sets the time parameters in (b) described above to a low-consumption slot transmission cycle (T2 of FIG. 8) of this Sniff mode.

The transmission/reception interval (T3 of FIG. 8) for maintaining the synchronization in this Sniff mode is made changeable in accordance with the changeable low-consumption slot transmission cycle (T2) of the Sniff mode described above.

(Park Mode)

When the Bluetooth control function unit 12 executes the Park mode, the Bluetooth low-consumption mode control unit 14 sets the time parameters in (b) described above to a synchronous correction cycle (T4 of FIG. 9) in this Park mode.

Further, the invention provides a wireless communications device 2 in which a Bluetooth control function unit 12 includes at least a Dial-up Networking Profile or Personal Area Profile as a Bluetooth profile, wherein the Bluetooth low-consumption mode control unit 14

(a) returns from a low-consumption mode to a normal mode when (i) a call established, in long distance wireless communications (6), with a third party device 4 uses a dedicated physical channel and (ii) close distance wireless communications (5) with the opposing device 3 shifts to the low-consumption mode and (b) shifts to the low-consumption mode immediately after the data being communicated runs out when the above established call uses a common physical channel.

In this case, in the (a) described above, the low-consumption mode is prevented from being shifted to even when the processing of the data being communicated ends.

Furthermore, in (a) described above, any request, from the opposing device 3, for shift to the low-consumption mode is rejected.

(iii) The invention further provides a wireless communications device 2 in which a Bluetooth control function unit 12 includes at least a Generic Object Exchange Profile (GOEP) as a Bluetooth profile, characterized in that this Bluetooth control function unit 12 includes a Bluetooth low-consumption mode control unit 14, and this Bluetooth low-consumption mode control unit 14 approves or prohibits a shift to a low-consumption mode in accordance with whether the data transfer with an opposing device 3 is in a single-data transfer mode having a small amount of data or an all-data transfer mode having a large amount of data, respectively.

Further, the Bluetooth low-consumption mode control unit 14 starts the shift to the low-consumption mode when the above all-data transfer mode ends.

Figure 2:
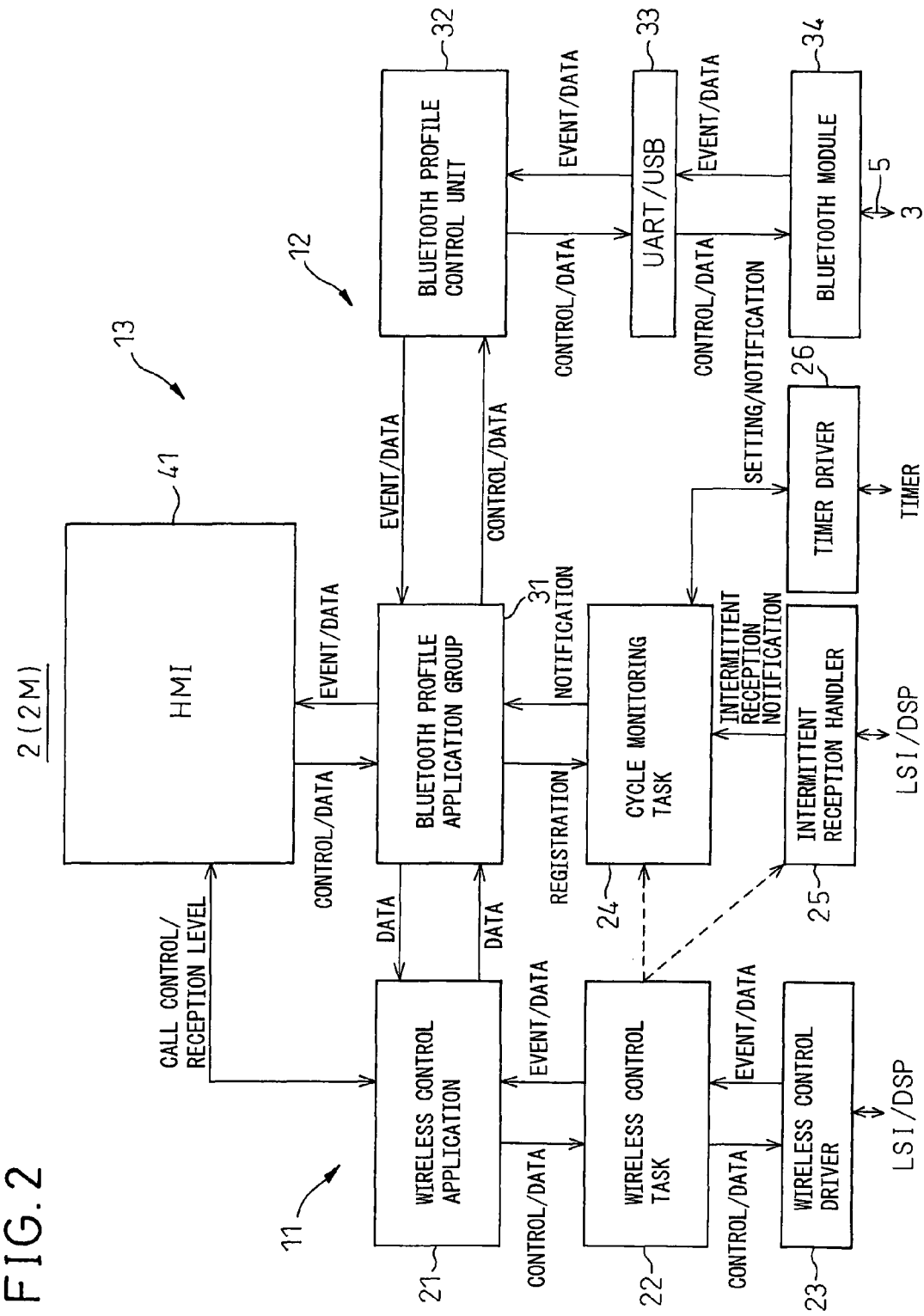
FIG. 2 is a view showing an embodiment of a wireless communications device according to the present invention.

Next, a concrete example of the basic configuration shown in FIG. 1 will be explained. FIG. 2 is a view showing an embodiment of a wireless communications device according to the present invention.

In the figure, the wireless control function unit 11, Bluetooth control function unit 12, and user interface unit 13 shown in FIG. 1 are represented as the function blocks 21 to 26, function blocks 31 to 34, and a function block 41. Note that, here, portions referred to as function blocks are, actually, mainly configured by software.

(i) First, one mode for realizing the optimum low-consumption mode under the Hands-Free Profile will be explained.

The Bluetooth Profile control unit 32 in the Bluetooth control function unit 12 transmits a control instruction and user data from the higher applications of a Bluetooth Profile application group 31 via the physical interface of the UART/USB 33 to a Bluetooth mobile 34. Conversely, it transmits a control event or user data received from the Bluetooth mobile 34 via the UART/USB 33 to the Bluetooth Profile application group 31 via the Bluetooth Profile control unit 32.

The Bluetooth Profile application group 31 is a set of applications for each profile. In this case, there are the profiles (applications) DUNP, PANP, HFP, and GOEP. Each application transmits a user setting etc. from a Human Machine Interface (HMI) 41 to the Bluetooth Profile control unit 32. Conversely, it notifies an event from the Bluetooth Profile control unit 32 to the HMI 41 in order to display the event on a screen.

On the other hand, a wireless control application 21 in the wireless control function unit 11 is an application for controlling a cellular or other wireless system corresponding to a mobile terminal 2M, i.e., a mobile phone and controlling calls to and from the base station 4B (or switching centre). It performs the transmission/reception of the data to and from the HMI 41 in order to display images on a screen and control the call origination/termination.

A wireless control task 22 worked with the above wireless control application 21 is a task for controlling the wireless system of the mobile terminal 2M. It is a lower layer of software and mainly controls the hardware relating to wireless operations by instructions from the wireless control application 21. For example, to realize the intermittent reception control system disclosed in Japanese Patent Publication (A) No. 2003-298493, an intermittent reception handler 25 notifies a cycle monitoring task 24 of the timing of intermittent reception. These cycle monitoring task 24 and intermittent reception handler 25 and timer driver 26 are hardware and software for realizing the "intermittent reception control system" disclosed in Japanese Patent Publication (A) No. 2003-298493. Further, in order to use this intermittent cycle timer in the Hands-Free Profile (HFP), an interface for registering the intermittent information into the cycle monitoring task 24 and suspending the intermittent operation and an interface for notifying the expiration of the time are provided (see "registration" and "notification" between blocks 31 and 24).

The HMI 41 worked with both the above-described application 21 and application group 31 handles a control relating the user interface such as the control of the display screen and an operation at the time of depressing a button.

Under the above Hands-Free Profile (HFP), the wireless control application 21 transfers the already explained reception level information to the HMI 41. Then, the HMI 41 usually displays the reception level on the display screen by converting the reception level to the number of antennas, for example 0 to 3, for easier understanding by the user. Then, under this HFP, it transmits the reception level (dB value) displayed at the HMI 41 or that value converted to the number of antennas for making the reception level easy to understand, as the reception level information, to the opposing device 3.

For this reason, the HFP application in the Bluetooth profile application group 31 receives the reception level information from for example the HMI 41 in a case where a change occurs in the dB value of the reception level or number of antennas or a case where a reception level measurement interval has arrived. When receiving this, it transmits that reception level information to the opposing device 3 via the Bluetooth Profile control unit 32.

Note that when the opposing device 3 receives the dB value of the reception level as it is, it displays this to the user, for easy understanding, by converting the reception level to the number of antennas. On the other hand, when notified of the number of antennas, it displays the notified number of antennas as it is on the screen.

When mobile terminal (mobile phone) 2M and the opposing device 3 now shift to the low-consumption mode of Bluetooth, the Bluetooth Profile control unit 32 performs the return operation from the low-consumption mode to the normal mode. After the completion of this return operation, it transmits the dB value or number of antennas, as the above-described reception level information, to the opposing device 3.

Here, the point of the present invention will be referred to. Usually, the reception level information is not used, at the opposing device 3, as a specific application for the user. Accordingly, the opposing device 3 does not have to display the information in real time by strictly working with the dB value of the reception level or number of antennas or other reception level information which are displayed at the mobile terminal (2M). Nevertheless, conventionally, whenever the dB value of the reception level or number of antennas changes or every time each reception level measurement cycle has come, it is notified these information to the opposing device 3. Therefore, the Bluetooth low-consumption mode is released for each above notification. For this reason, the low above consumption effect is reduced. This is a problem.

The idea of the present invention resides in the filtering of the changes of the dB value of the reception level or number of antennas, in order to maintain the effect of the low power consumption at the R point. Due to this, frequent shifts from the low-consumption mode to the normal mode can be avoided. For example, at a certain timing, the dB value of the reception level or number of antennas is notified to the opposing device 3, and then, within a predetermined time (for example, 10 seconds), the transmission of the change of the dB value of the reception level or number of antennas from the mobile phone (2M) side is suspended, and thus the change is not notified to the opposing device 3. Due to this, it is possible to reduce the number of return operations to the low-consumption mode and obtain the inherent effect of the Bluetooth low-consumption mode.

Next, when assuming application of the present invention to the system of already explained Japanese Patent Publication (A) No. 2003-298493, the mobile phone (2M) monitors the paging signal addressed to itself (2M) from the base station 4B while performing intermittent reception at the standby state and starts a timer having a time which is different from the intermittent reception cycle, for example a timer mounted in an LSI, for the purpose of achieving the above-described filtering according to the present invention. If doing this, since the timings (clocks) between that intermittent reception cycle and timer are asynchronous, therefore the time of the timer expires at a timing different from the intermittent reception cycle. The situation in this case will be explained by using FIG. 3.

Figure 3:
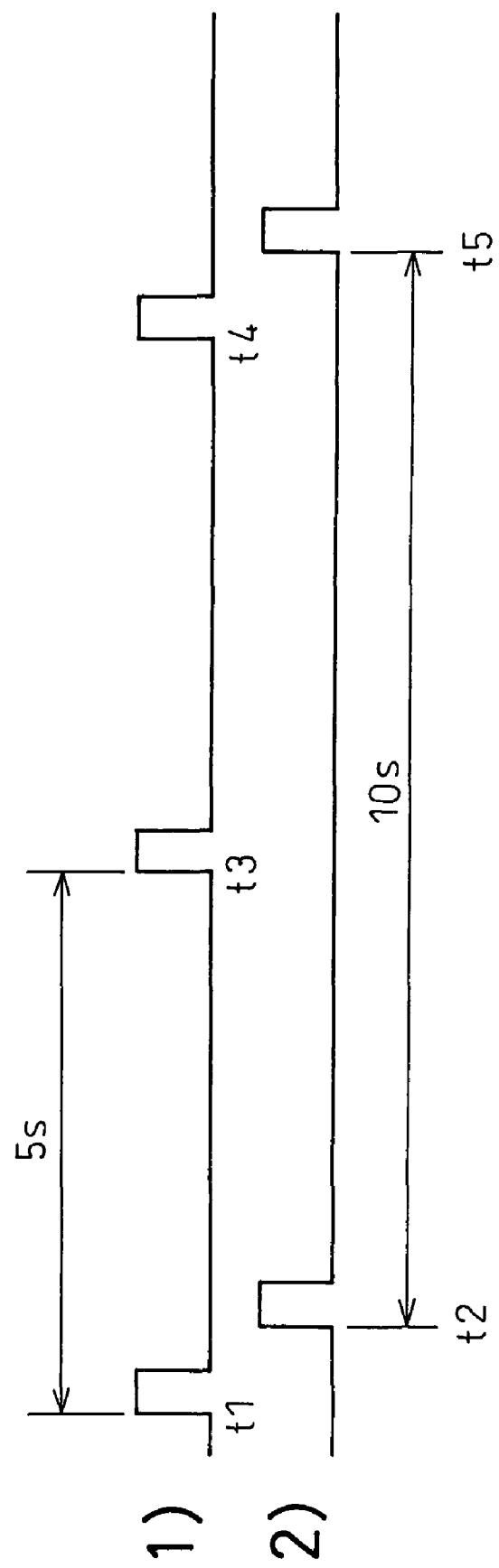
FIG. 3 is a view showing a case where timings of intermittent reception and filtering are asynchronous.

FIG. 3 is a view showing a case where timings of the intermittent reception and the filtering are asynchronous. 1) in the figure shows the timing of the intermittent reception explained above between the mobile terminal 2M and the base station 4B. As an example, an interval of 5 seconds (5 s) is shown. Further, 2) in the figure shows an interval of 10 seconds (10 s) as an example showing the timing for transmitting the above-described reception level information from the mobile terminal 2M to the opposing device 3 while thinning by the above-explained filtering.

As illustrated, when the intermittent reception period is 5 seconds and the interval of the timer for the filtering is 10 second and if the timer for the filtering starts counting (t2) a little after the intermittent reception cycle (t1), the intermittent reception processing will be performed 2 times (t3 and t4) between the start point thereof (t2) and the point when the time runs out (t5). That is, the CPU in the mobile terminal 2M receives the clock two times. This means that excessive power is consumed by that amount.

Therefore, when filtering the reception level information and transmitting it to the opposing device 3, the transmission point thereof (t2) is made match with the point of the intermittent reception (t1). That is, both timings of 1) and 2) are synchronized. If doing this, the processing of the intermittent reception can be reduced from the above-described two times to one time (only t3) and a further reduction of power consumption of the mobile terminal 2M can be achieved. Further, as will be explained later with reference to FIG. 4, if transmitting the reception level information to the opposing device 3 only when there is a change between the previous and current reception level information, there is a possibility that the transmission at t5 in the figure can be omitted and a further reduction of power consumption can be achieved. Namely, by using a timer synchronized with the intermittent reception cycle shown in Japanese Patent Publication (A) No. 2003-298493, the use of the conventional timer mounted in the LSI can be avoided, and the filtering of the number of transmissions of the reception level information becomes possible without reducing the effect of the intermittent reception.

Figure 4:
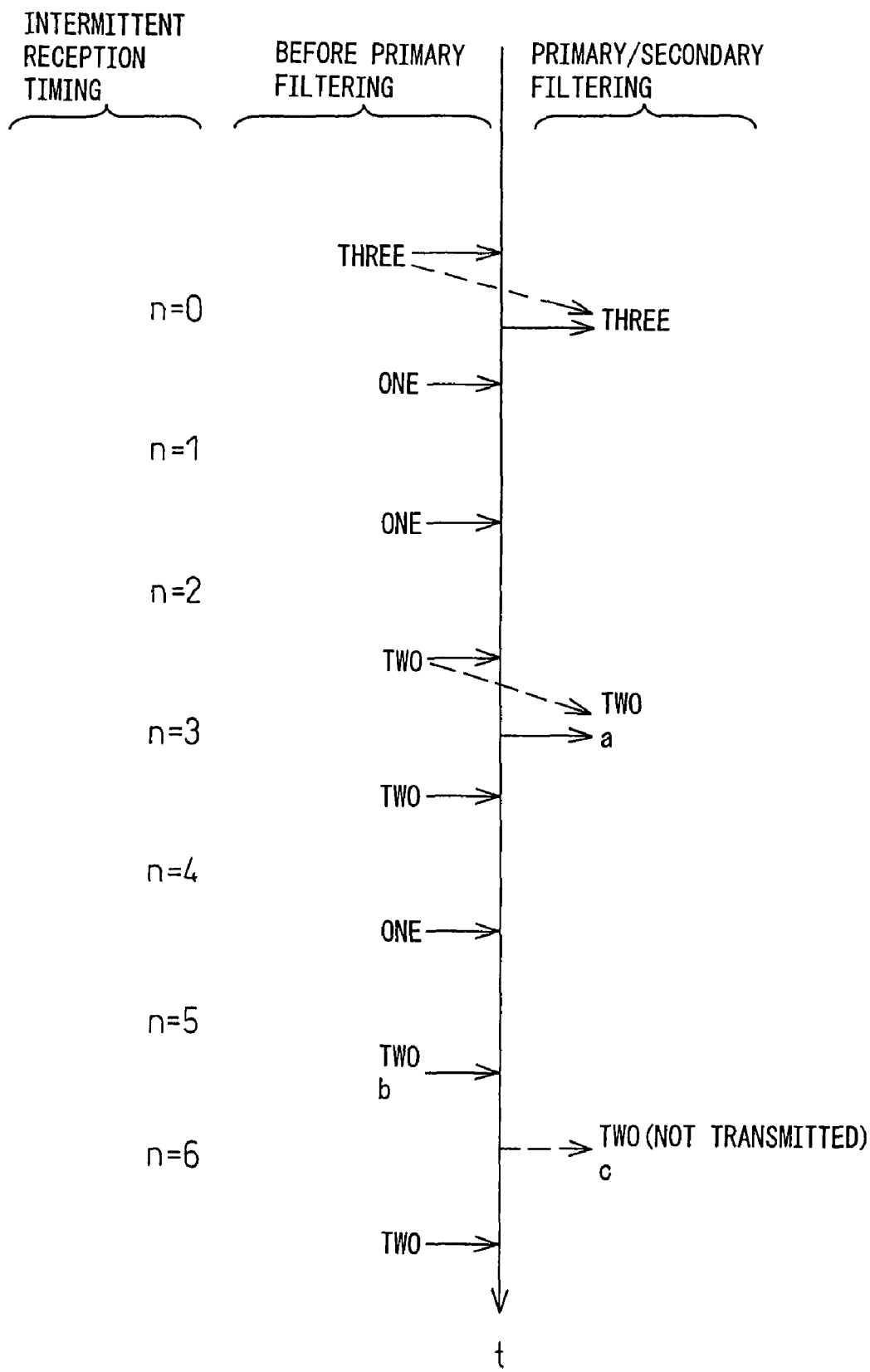
FIG. 4 is a view showing a more preferred method of filtering according to the present invention.

FIG. 4 is a view showing a more preferred method of filtering than that explained above and shows filtering configured so as to transmit the current reception level information to the opposing device 3 only when there is a change between the previous reception level information and the current reception level information, as explained above.

In the figure, the ordinate t indicates the elapse of time. n=0, n=2, . . . on the left end indicate the intermittent reception timings and correspond to the timings (5 seconds) of t1, t3, t4, . . . in FIG. 3. The "Three", "One", "One", . . . at the center indicate the reception level (displayed as numbers of antennas) information, before the primary filtering, to be transmitted to the opposing device 3. Further, the "Three", "Two", . . . on the right end indicate the transmission of further filtered reception level information (numbers of antennas). That is, the figure shows the case where only a reception level causing a change, among reception levels after the primary filtering, is selectively transmitted by secondary filtering.

According to the filtering of 2) shown in FIG. 3, originally, the reception level information must be transmitted to the opposing device 3 as "Three", "Two", "Two", . . . by the primary filtering of the primary/secondary filtering of FIG. 4, however, by a further secondary filtering, since there is no change between the previous "Two" (a of FIG. 4) and the current "Two" (b of FIG. 4), therefore "Two" by the primary filtering (c of FIG. 4) will not be transmitted by the secondary filtering. Note that the explanation of FIG. 4 will be further supplemented later.

Figure 5:
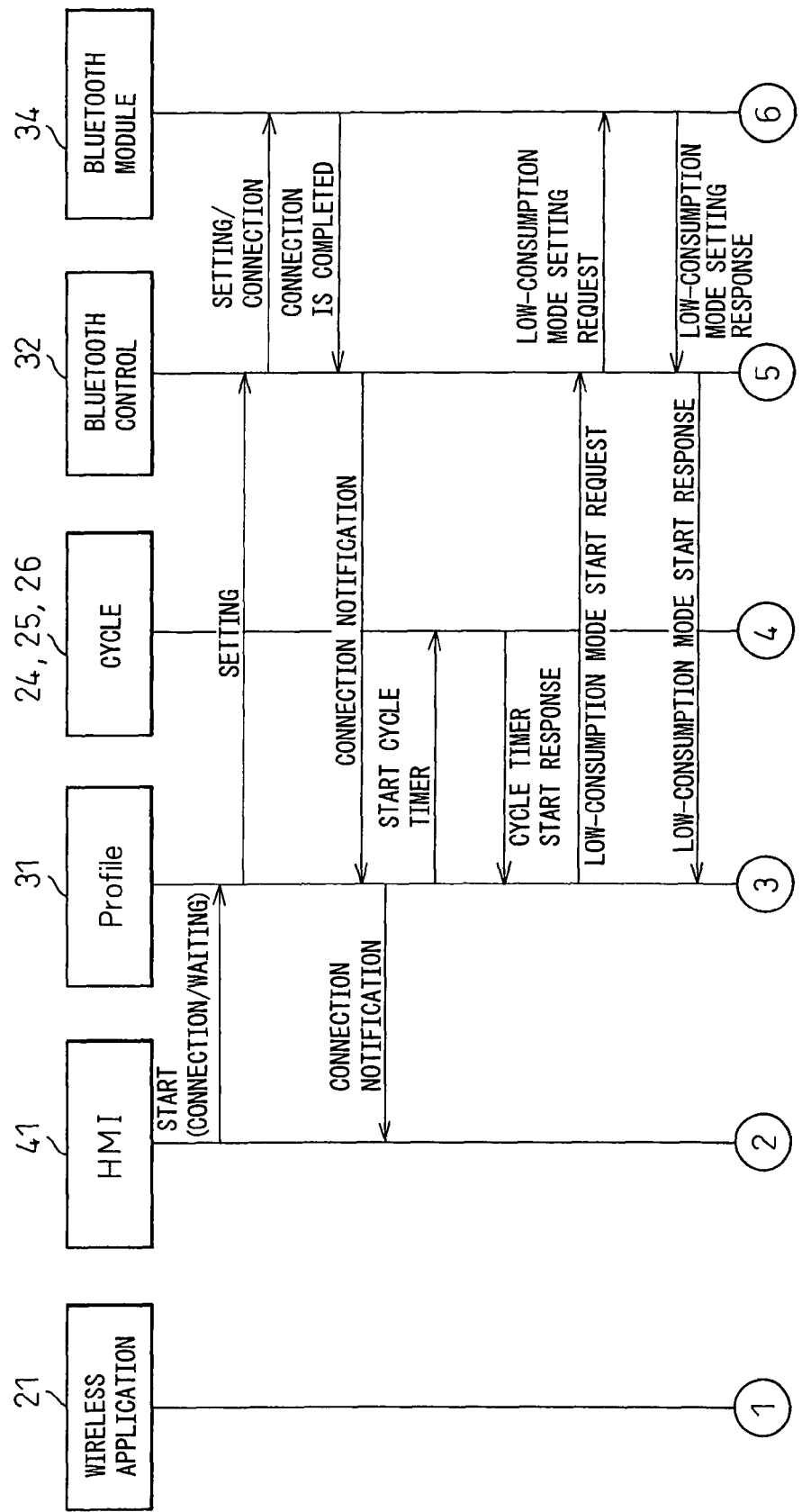
FIG. 5 is a sequence diagram showing a low-consumption mode processing under a Hands-Free Profile (HFP) (first).
Figure 6:
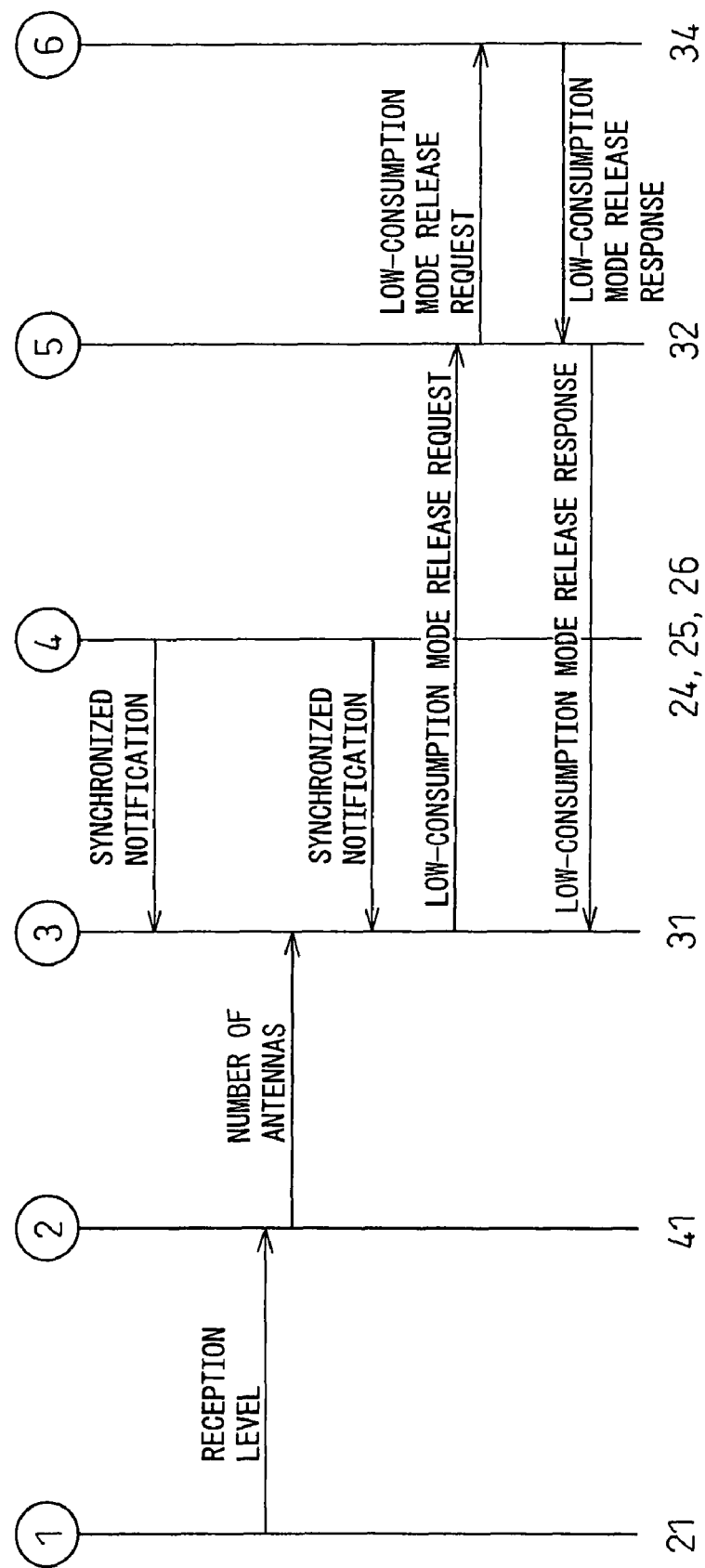
FIG. 6 is a sequence diagram showing a low-consumption mode processing under a Hands-Free Profile (HFP) (second).

FIG. 5 is a sequence diagram showing the low-consumption mode processing under the Hands-Free Profile (HFP) (first part), and FIG. 6 is a diagram of the same (second part).

The user operates the menu of "Connection" via the HMI 41 when connecting to the opposing device 3. Conversely, when standing by for connection from the opposing device 3, the user operates the menu of "Standby". The HMI 41 transfers the information concerning the opposing device 3 (for example BD_ADDR) when "Connection" is selected, while transfers the information concerning the standby conditions (for example security requirements etc.) when "Standby" is selected, respectively, to the HFP application of the Bluetooth Profile application group 31.

The HFP application transfers the above-described information transferred from the HMI 41 to the Bluetooth Profile control unit 32 by the instruction from the HMI 41. This information is a unique number of the opposing device 3 (Bluetooth device address (hereinafter, referred to as BD_ADDR) in the case of FIG. 5 (Connection).

The Bluetooth Profile control unit 32 performs the settings relating to "Connection", for example, the presence/absence of authentication or presence/absence of encryption, and the settings of parameters relating to the baseband in the Bluetooth module 34 via the USB/UART 33 and starts the connection operation.

When the Bluetooth connection at the R point is completed, the connection completion event is notified from the Bluetooth module 34 via the USB/UART 33 to the Bluetooth Profile control unit 32. The Bluetooth Profile control unit 32 notifies that the "Connection" is completed to the HFP application in the Bluetooth Profile application group 31. Further, the HFP application (31) notifies the connection completion to the HMI 41 so as to display the screen of connection completion. Then, in order to notify the reception level information, it starts the cycle timers (25, 26). When there is no reception level information to be transmitted to the opposing device 3, immediately after the reception of an acknowledge response from the cycle monitoring task 24, the low-consumption mode operation to be applied is designated, and a request to shift to the low-consumption mode is notified to the Bluetooth Profile control unit 32.

The Bluetooth Profile control unit 32 designates the parameters of the low-consumption mode via the UART/USB 33 and transmits the request to shift to the low-consumption mode to the opposing device 3. By receiving the acknowledge response from the opposing device 3 (illustration is omitted), the event is notified from the Bluetooth module 34 to the Bluetooth Profile control unit 32. The Bluetooth Profile control unit 32 receiving this event transmits a low-consumption mode transition start command (not shown) to the HFP application (31). Due to this, the HFP application (31) recognizes that the mobile terminal (mobile phone) 2M and the opposing device 3 shifted to the low-consumption mode.

In FIG. 6, the wireless control application 21 measures the reception level at a constant interval. The measured reception level information must be displayed on the screen of the HMI 41, and therefore, whenever performing this measurement, it notifies the reception level information to the HMI 41. The HMI 41 notifies the reception level information (dB value or the value converted to the number of antennas) to the HFP application (31) simultaneously with the display of the reception level information on the screen. Whether the dB or number is used is determined according to the implementation.

If not applying the filtering of the present invention, the HFP application (31) tries to notify the reception level information to the opposing device 3 every time. However, if the mobile terminal (mobile phone) 2M and the opposing device 3 have shifted to the low-consumption mode, since the user data cannot be transmitted in this low-consumption mode, it is necessary to once release the low-consumption mode in order to notify the reception level information thereof. The HFP application (31) notifies a release request of the low-consumption mode to the Bluetooth Profile control unit 32. The Bluetooth Profile control unit 32 further notifies the release request of the low-consumption mode to the Bluetooth module 34 via the UART/USB 33.

The Bluetooth module 34 transmits a message for requesting the release of the low-consumption mode to the opposing device 3. Responding to this, when receiving an acknowledge response from the opposing device 3, the Bluetooth module 34 notifies the event indicating that the low-consumption mode is released to the Bluetooth Profile control unit 32. The Bluetooth Profile control unit 32 notifies the release of the low-consumption mode to the HFP application (31). The HFP application (31) receiving this low-consumption mode release notification transmits the reception level information to the opposing device 3.

As already explained in FIG. 3, when transmitting the reception level information to the opposing device 3 at a timing different from the intermittent reception timing, the power saving effect by the intermittent reception is degraded. At the same time, a return operation from the low-consumption mode must be carried out, so the effect of the low-consumption mode is also degraded. Therefore, the HFP application (31) performs also the operation explained in FIG. 4. When explaining FIG. 4 again, the intervals of filtering are n=0, n=3, and n=6.

When the Bluetooth connection is completed, the HFP application (31) starts the timer by using the function provided by the cycle monitoring task 24. The HFP application (31) receiving the reception level information from the HMI 41 transmits the reception level information to the opposing device 3 at n=0 as the first intermittent reception timing shown in FIG. 4 and stores this transmitted information (here, number of antennas 3) in the storing means 15. The number of antennas (one) to be notified next and the number of antennas (one) to be notified further next are ignored by the primary filtering. The number of antennas (two) received the third time becomes the timing for transmission to the opposing device 3 by the primary filtering, therefore, it is judged if there is a difference compared to the number of antennas (three) received when n=0. In this case, since the number of antennas has changed, the antenna number information is transmitted to the opposing device 3 at the timing of n=3, and the number of antennas "2" is stored in the storing means 15. In the same way, transmissions at n=4 and n=5 are foregone by the primary filtering. When n=6, the number of antennas is compared with the number of antennas transmitted at n=3. In this case, there is no difference between the antenna number information (two) transmitted at n=3 and the antenna number information (two) to be transmitted this time, therefore, the transmission thereof to the opposing device 3 is foregone by the secondary filtering. Note that, in the example of FIG. 4, as the filtering, n=3 is set, however, by extending a time parameter $\underline{n}$, a further low-consumption mode effect becomes possible. This time parameter $\underline{n}$ may be a fixed value or made changeable in accordance with the change of the reception level information to be transmitted.

(ii) Next, a mode for realizing the optimum low-consumption mode under the Dial-up Networking Profile (DUNP) or Personal Area Network Profile (PANP) will be explained. In this mode, the Bluetooth low-consumption mode control unit 14 for Bluetooth low-consumption mode control according to any of the Hold mode, Sniff mode, or Park mode (a) determines whether to validate or invalidate the low-consumption mode in accordance with the user rate when performing the long distance wireless communications (6) with the third party device 4 and (b) when validating the low-consumption mode, further makes the time parameter Pt of the corresponding mode changeable.

In the case of DUNP or PANP, when a high speed throughput is required at the U point, sometimes a long time is taken for the return operation from the low-consumption mode at the R point and the required high speed throughput cannot be achieved. As described above, as the low-consumption mode at the R point, there are three types, that is, the Hold mode/Sniff mode/Park mode.

Figure 7:
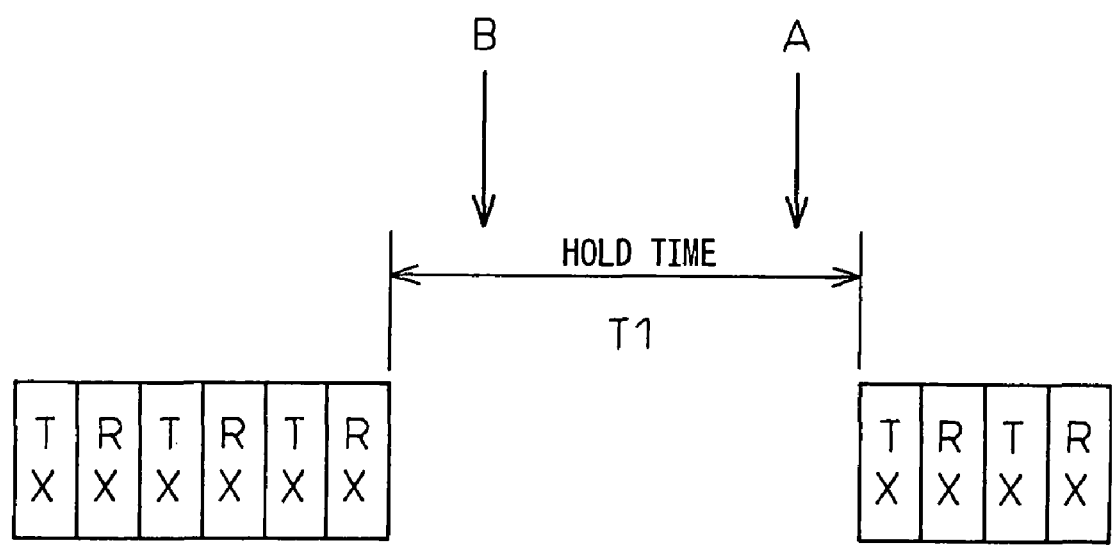
FIG. 7 is a view for explaining a Hold mode.

FIG. 7 is a view for explaining the Hold mode. When the Bluetooth control function unit 12 executes this Hold mode, the Bluetooth low-consumption mode control unit 14 determines the time parameter Pt in (b) explained above to the Hold time T1 in the Hold mode.

FIG. 7 shows the master side between the pair of master side and slave side devices constituting the Bluetooth. At the time interval of the shown Hold time T1, the master side suspends the transmission/reception operation of the slot (transmission TX/reception RX). Also, the slave side suspends the transmission/reception operation. Accordingly, the longer the Hold time T1, the larger the effect of low-consumption mode. This is because the transmission/reception of data cannot be carried out in the period T1 indicated by this Hold time. When an opportunity for data transmission to the opposing device 3 occurs at the timing of A in FIG. 7 on the mobile phone (2M)/gateway side, that is, the wireless communications device 2 side, the time until an instance where the transmission/reception becomes possible is short. However, when this occurs at the timing of B in FIG. 7, the time until an instance when transmission/reception becomes possible is long, and the transmission/reception of the data cannot be carried out during this, therefore there is an influence upon the throughput at the U point.

Therefore, when the interval T1 indicated by the Hold time is made short, the time until an instance when the transmission/reception becomes possible can be made short, and it becomes possible to make the influence upon the throughput at the U point small. However, conversely, the effect of the low-consumption mode is reduced.

Therefore, when the Hold time T1 is made changeable to short or long in accordance with the user rate at the U point, the low-consumption mode is realized without lowering the throughput at the U point.

Figure 8:
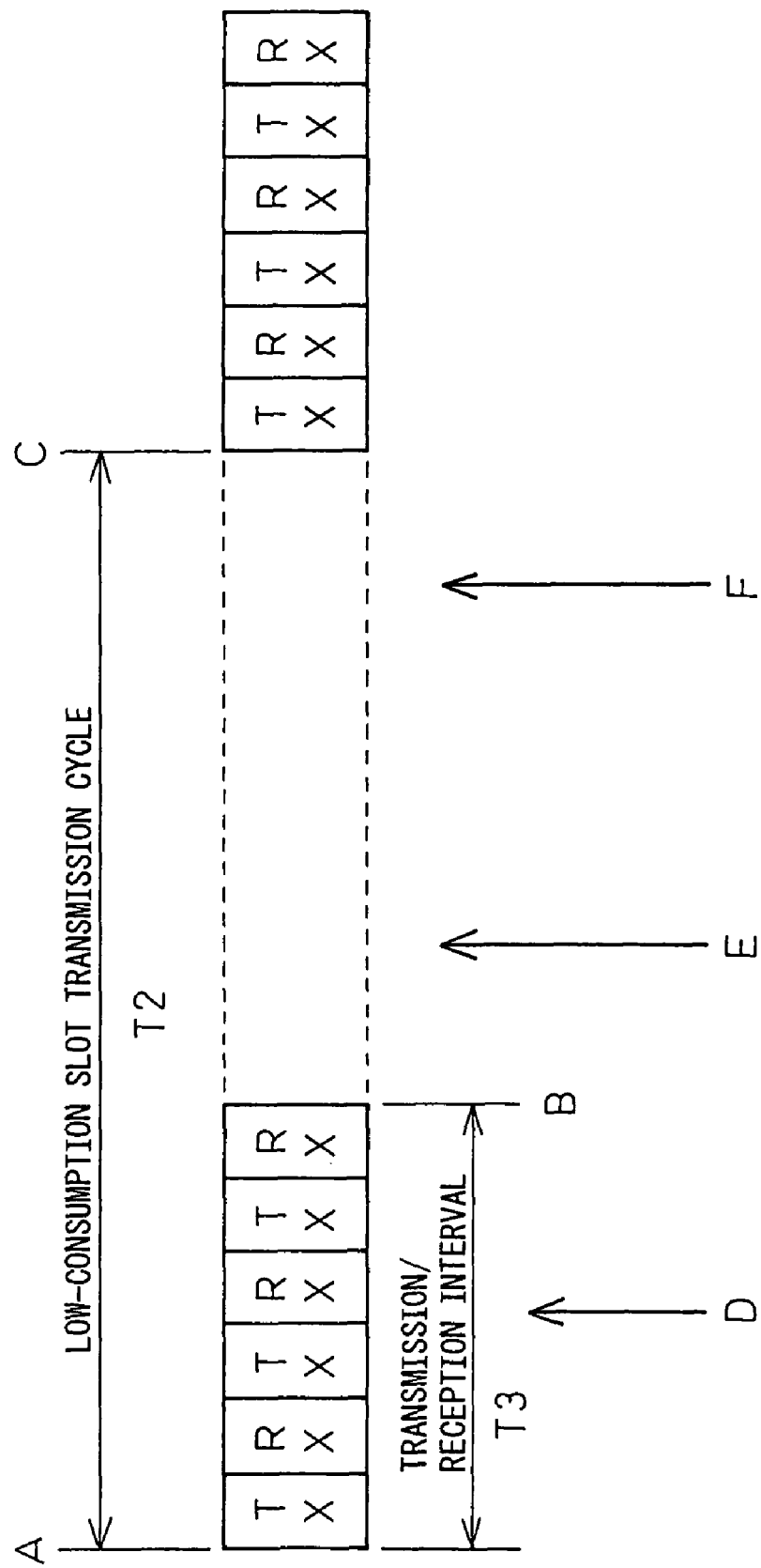
FIG. 8 is a view for explaining a Sniff mode.

FIG. 8 is a view for explaining the Sniff mode explained above. When the Bluetooth control function unit 12 executes the Sniff mode, the Bluetooth low-consumption mode control unit 14 sets the time parameter Pt in (b) explained above to the low-consumption slot transmission cycle T2 of the Sniff mode. In this case, it is desirable to match with the low-consumption slot transmission cycle T2 of the above-described changeable Sniff mode and also make the transmission/reception interval T3 for maintaining the synchronization in the Sniff mode changeable.

FIG. 8 is shown based on the master side. The transmission/reception interval T3 is the time during which the slot (TX/RX) can be transmitted/received for both of the master/slave side, while the low-consumption slot transmission cycle T2 is a time until the transmission/reception interval T3 is repeated again. In the figure, the smaller the ratio between the time A-C and the time A-B, the higher the effect of the low-consumption mode. The master side transmits the slot for maintaining the synchronization with the slave side at the TX slot of the transmission/reception interval T3.

The slave side receives the slot from the master side and if there is a slot addressed to itself, it responds thereto by using the slot which can be transmitted in the transmission/reception interval T3, shifts from the Sniff mode to the normal mode, and receives the related user data.

In the Sniff mode, transmission/reception of the user data is not possible. When an opportunity for data transmission to the opposing device 3 occurs in the term of A-B (D point) in FIG. 8 or a timing (F point) near the C point on the mobile phone/gateway side, that is, the wireless communications device 2, the time until the start of the return operation from the Sniff mode to the normal mode becomes long, therefore it is possible to reduce the influence upon the throughput at the U point. On the other hand, if that opportunity for data transmission occurs near the time (E point) immediately after the transmission/reception interval T3, the return operation to the normal mode is kept waiting until the time indicated by the C point, and there is an influence upon the throughput at the U point. In the end, when the time of A-C is made short or the time of A-B is made long, it is possible to make the waiting time until the start of the return operation short. However, conversely, the effect of the low-consumption mode is reduced. Thus, when the above-described T2 and further the above-described T3 are adjusted in accordance with the user rate at the U point, a low-consumption mode is realized without lowering the throughput at the U point.

Figure 9:
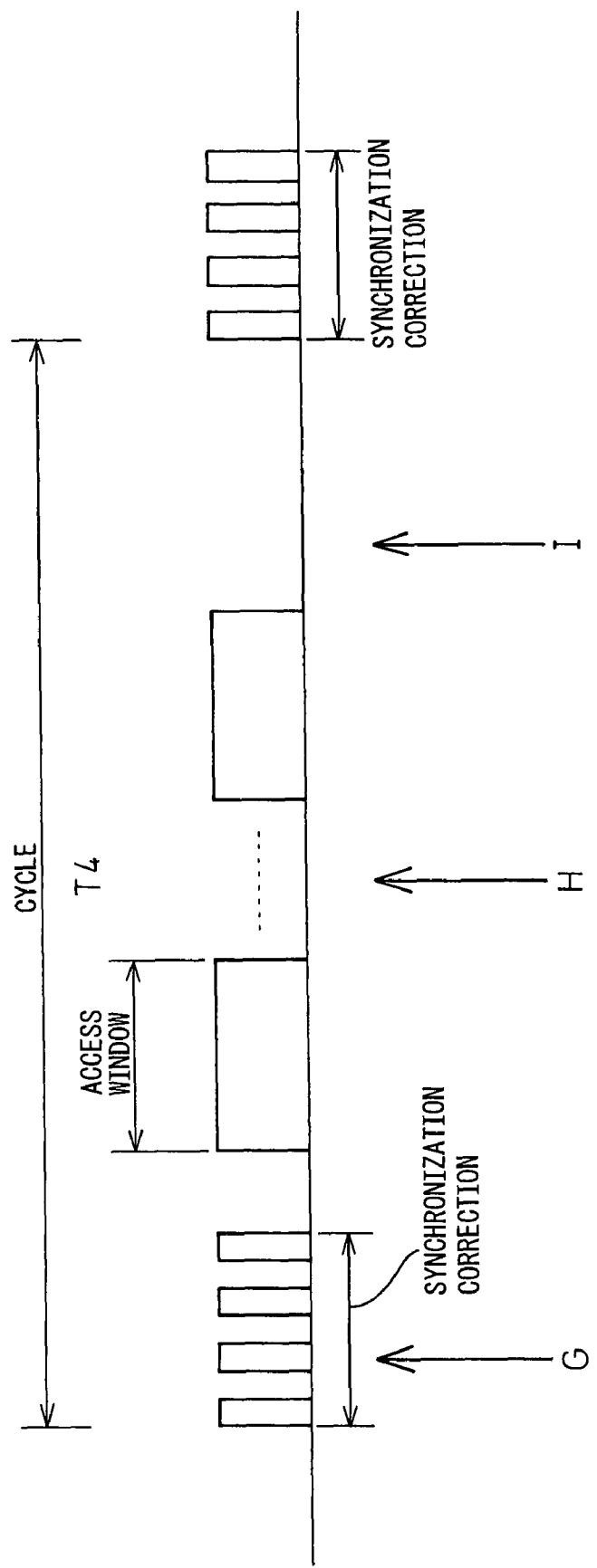
FIG. 9 is a view for explaining a Park mode.

FIG. 9 is a view for explaining the Park mode. When the Bluetooth control function unit 12 executes this Park mode, the Bluetooth low-consumption mode control unit 14 sets the time parameter Pt in (b) explained above to the cycle T4 of the synchronization correction in the Park mode.

FIG. 9 is shown based on the master side. The period T4 described as the "cycle" is the interval including the "synchronization correction" with some "access windows" in the middle. The period described as the "synchronization correction" is a period for correcting the difference between the timing of the master side and the timing held by itself (slave side). The period described as the "access window" is a period during which the release of the low-consumption mode is possible between the master side and the slave side and is repeated several times. The longer the cycle T4, and the smaller the number of repetitions of the access window or the shorter the period thereof, the higher the effect of the low-consumption mode.

In the Park mode, transmission/reception of the user data is not possible. On the mobile phone/gateway side, that is, the wireless communications device 2, if the opportunity for data transmission to the opposing device 3 is the timing of the synchronization correction or the period of the access window in FIG. 9, the time until the return operation from the Park mode to the normal mode starts is short, therefore it is possible to make the influence upon the throughput at the U point small. On the other hand, when the opportunity for data transmission occurs near the time immediately after the "access window" passes, the return operation to the normal mode will be kept on standby until the instance of the next "synchronization correction", and there arises an influence upon the throughput at the U point. In the final analysis, by making the cycle T4 short or making the period of the access window long or increasing the number of repetitions of the access window, it is possible to make the standby time until the start of the return operation short. However, the effect of the low-consumption mode is reduced. Thus, if the above-described T4 is adjusted in accordance with the user rate at the U point, the low-consumption mode is realized without lowering the throughput at the U point.

Figure 10:
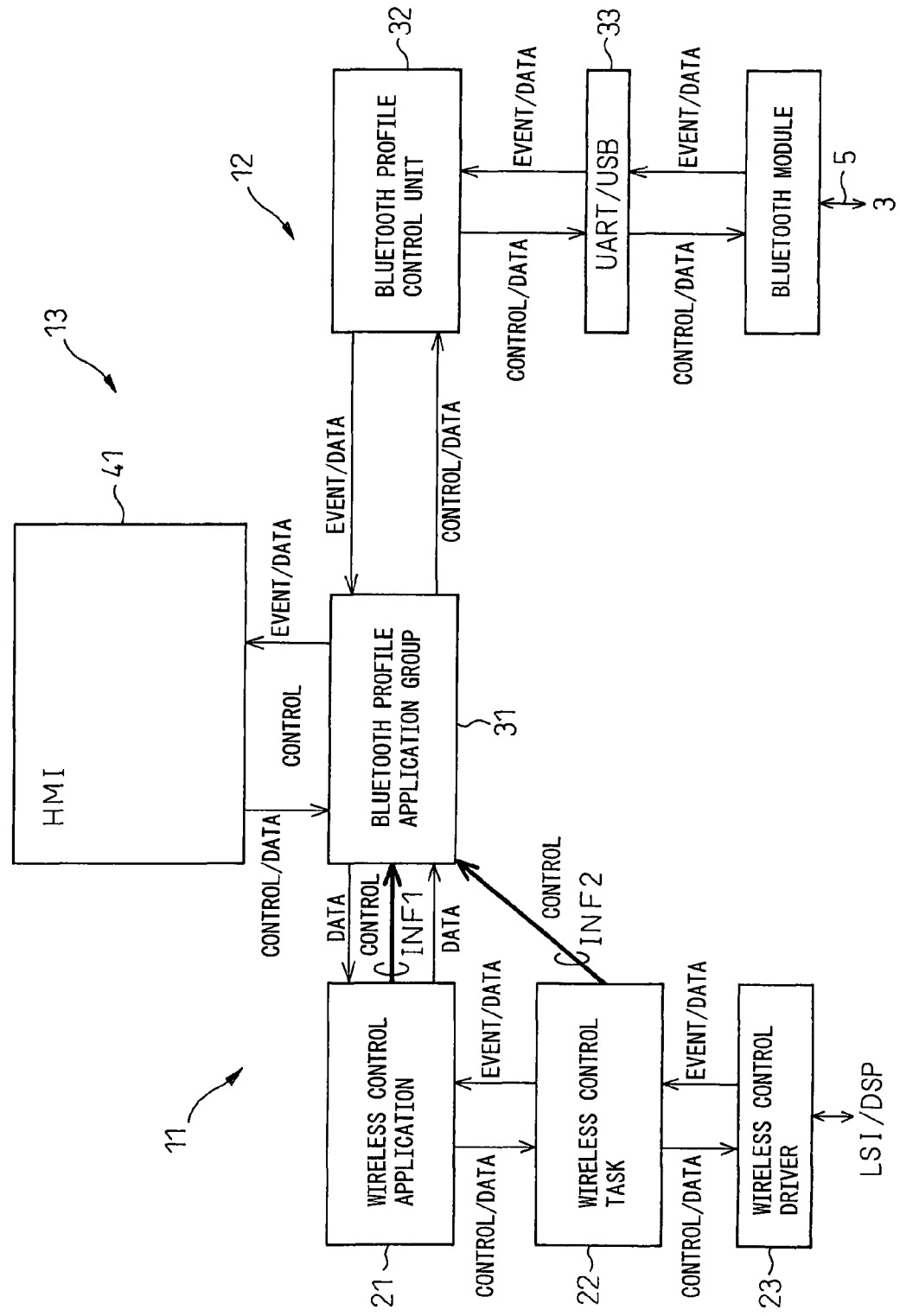
FIG. 10 is a view showing an embodiment of a wireless communications device controlling the low-consumption mode in accordance with a user rate at a U point.

FIG. 10 is a view showing an embodiment of a wireless communications device 2 in the mode of controlling the low-consumption mode in accordance with the user rate at the U point explained above. Note that the configuration of the figure is the configuration shown in FIG. 2 minus unnecessary portions.

First, starting with a general discussion, the control of transition to the low-consumption mode is generally simply carried out in accordance with presence/absence of the data being transmitted/received. In this general method, the control is one-dimensional control of the presence/absence of data. Further, the parameters of the low-consumption mode are also often one pattern.

Here, when considering the case where the required throughput at the U point is a high speed, selection to send on the user data as it is without the low-consumption mode operation at the R point can be considered. However, in the case where the throughput at the U point supports some of user rates, if the one pattern as explained before is adopted, the operation of not performing control of the low-consumption mode for all user rates ends up being performed.

Further, at such a high speed user rate, selection of securing the throughput by sacrificing the effect of the low-consumption mode is possible, but at the middle speed or low speed user rate, reduction of the power consumption by applying the low-consumption mode is necessary together with the securing the throughput. Particularly at a middle speed the user rate, when low-consumption mode parameters peculiar to the middle speed user rate are applied without applying the low-consumption mode parameters at the low speed user rate, securing the throughput is possible.

In this way, the present invention achieves both the contradictory requests of (a) securing the throughput and (b) executing the low-consumption mode by judging the presence/absence of application of the low-consumption mode and also controlling the time parameters at the time of adopting this low-consumption mode, based on information of the user rate at the U point.

In order to judge the presence/absence of application of the Bluetooth low-consumption mode, an interface (INF) is newly provided either between the Bluetooth Profile application group 31 and the wireless control application 21 or between the Bluetooth Profile application group 31 and the wireless control task 22 (see INF1 and INF2 of FIG. 10).

Figure 11:
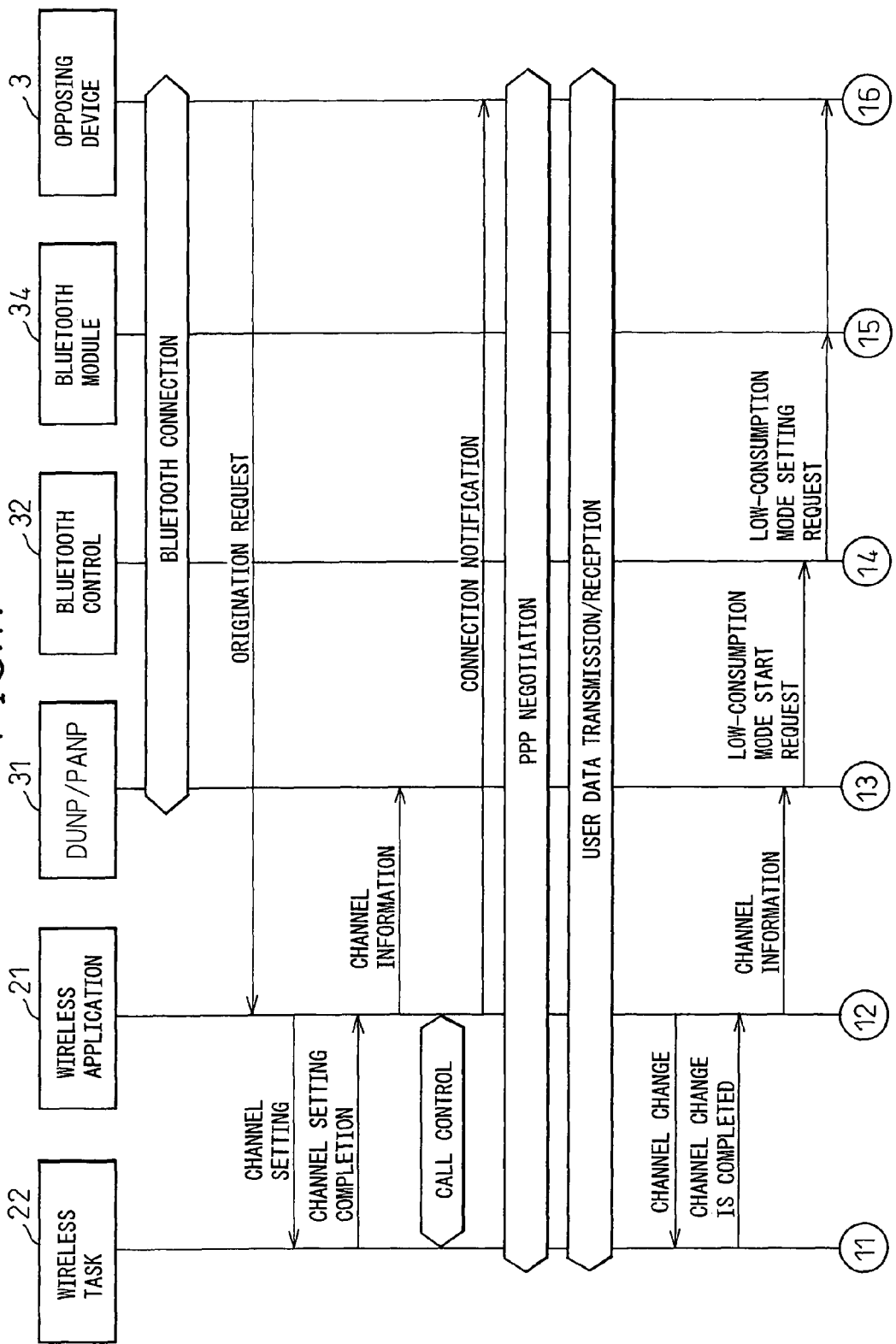
FIG. 11 is a sequence diagram showing a low-consumption mode processing under a DUNP or PANP (first).
Figure 12:
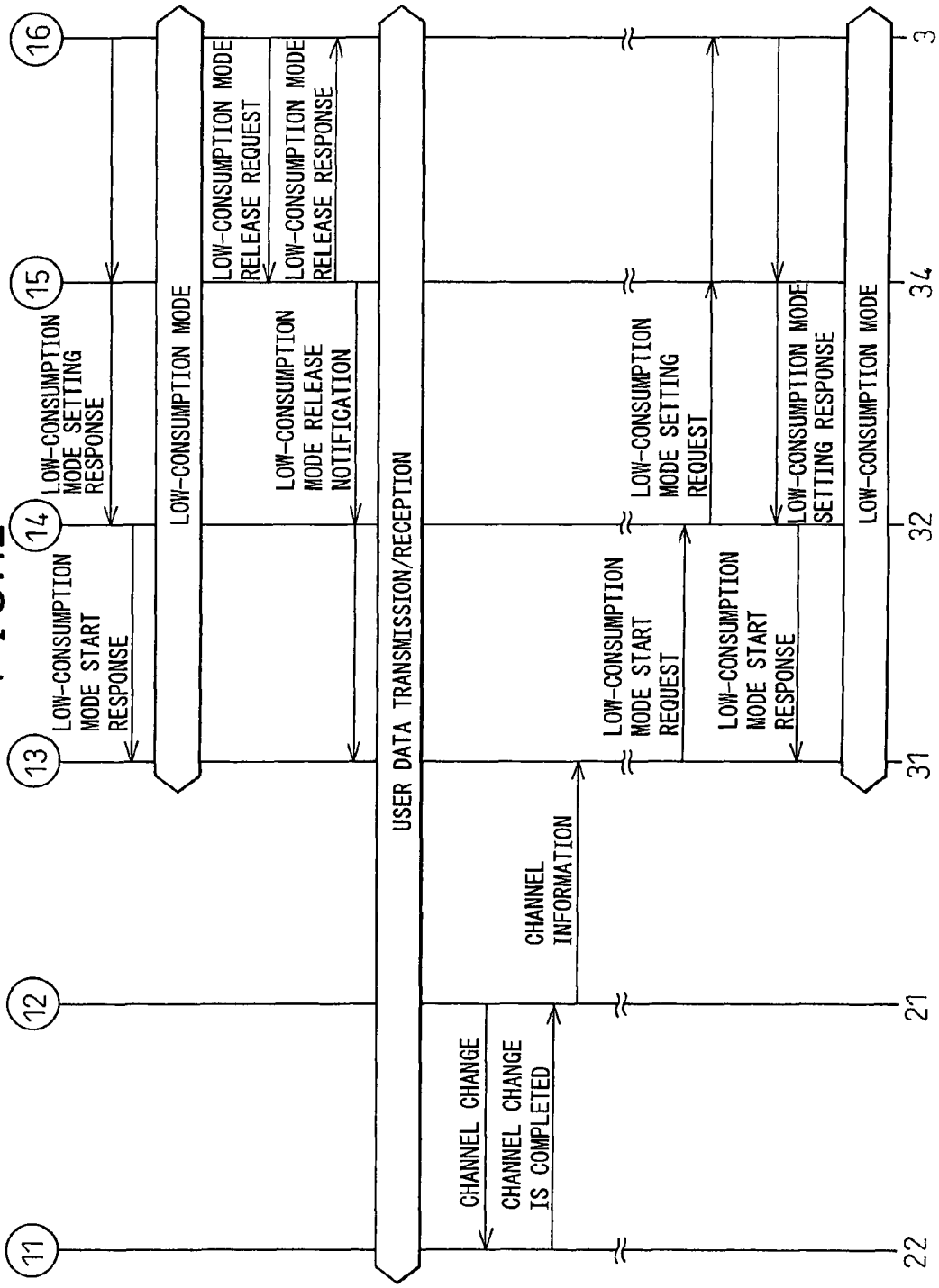
FIG. 12 is a sequence diagram showing a low-consumption mode processing under a DUNP or PANP (second).

FIG. 11 is a sequence diagram showing the low-consumption mode processing under the Dial-up Networking Profile (DUNP) or Personal Area Network Profile (PANP) (first part), and FIG. 12 is a diagram of the same (second part). Here, a case where an interface (INF1 of FIG. 10) is newly added between the wireless control application 21 and the Bluetooth Profile application group (DUNP/PANP application) 31 is described.

When the Bluetooth connection is completed, a call is originated from the opposing device 3, that is, the PC (3P), PDA, etc., by using the "Bluetooth connection". The DUNP/PANP application (31) transfers the call origination signal to the wireless control application 21 (illustration is omitted). The wireless control application 21 receiving the signal sets the physical channel or logical channel according to the wireless system of the mobile phone. When the setting of these channels is normally completed, the wireless control task 22 notifies the completion to the wireless control application 21. The wireless control application 21 transfers the information concerning the established channel to the DUNP/PANP application (31). The transferred parameters of DUNP/PANP are held at the DUNP/PANP application (31). Further, using the parameters received at this time, the user rate at the U point explained above is found with reference to the table of FIG. 13 explained later, the packet type used at the R point is determined, and a parameter indicating whether or not the low-consumption mode is to be executed is transferred to the Bluetooth Profile control unit 32. The Bluetooth Profile control unit 32 negotiates, with the opposing device 3, the packet type and when reaching agreement thereof, performs the following communications with that packet type.

When judging that there is no longer any user data during the transmission/reception, the DUNP/PANP application (31) selects the presence/absence of low-consumption mode control and the time parameters for the low-consumption mode control by using the table of FIG. 13 and transmits the start request of the low-consumption mode to the Bluetooth Profile control unit 32.

FIG. 13 is a view showing concrete examples of the parameters explained above. In the figure, "Rate" represents the user rate at the U point, while "LC (Logical Channel)", "TB (Transport Block)", and "TFS (Transport Format Set)" are the information used for judging which user rate (64/128/256 kbps) at the U point is to be used. "AM" represents an Acknowledge Mode. Further, "TTI" is the Transmission Time Interval expressed in units of ms. "PHY" indicates whether the channel is a dedicated physical channel or a common physical channel explained later, and "D" represents the dedicated physical channel.

On a basis of the information of the above "LC" to "PHY", according to the "transmission cycle" and the "interval", the application (whether the low-consumption mode is to be applied (○) or not to be applied (X) is determined. When this is to be applied, how long the time parameter Pt at that time is to be set is determined.

First, the parameters transferred from the wireless control application 21 or the wireless control task 22 will be explained. Referring to FIG. 13 (table) explained above, the table generally shows communications of the packet exchange system, that is, the parameter when switching the rate: 64 kbps/128 kbps and the parameter of the low-consumption mode (Sniff mode here). The above LC size is the PDU (Protocol Data Unit) size of the logical channel. The LC mode indicates the transmission mode of the layer 2. There are three types: the normal TM (Transparent Mode), UM (Unacknowledge Mode), and already explained AM. These are used for differentiating channel settings of the line switching type or packet switching type.

The TB size is a parameter not existing in all wireless systems and is the PDU size of the lower layer 2. The above-described TFS is the time indicated by the above-described TTI and indicates how many TBs can be sent. The largest value among the values shown in the table of FIG. 13 indicates the maximum rate. Further, as described above, the PHY ch indicates an attribute of the physical channel and, as already explained, indicates which of the dedicated physical channel or the common physical channel is to be used. From these parameters, the user rate at the U point is specified and whether or not the low-consumption mode is to be applied and the low-consumption parameters (time parameters) at the time of application of the low-consumption mode are determined. Note that the above-described maximum rate is determined by the following equation.

LC size×maximum value of TFS/TTI×1000

According to the size found in the above equation, the Bluetooth packet type which can be transferred at a high speed is selected. If the user rate at the U point is 128 kbps, as the rate at the R point, 387.2 kbps/477. kbps (both have error corrections) or 585.6 kbps/723.2 kbps (both include no error correction) can be selected. Simply considered, when 387.2 kbps is selected, at the R point, it is possible to transfer the user data at a speed of 3 (about 387.2/128) times the speed at the U point, therefore during the transmission/reception processing at the U point, the low-consumption mode can be shifted to at the R point.

When there is no longer transmission/reception data on the Bluetooth, the DUNP/PANP application (31) shifts to the low-consumption mode by using the parameter corresponding to the user rate found above. On the other hand, when there is data transmission from the opposing device 3, the release request of the low-consumption mode is transmitted from the opposing device 3. The Bluetooth module 34 sends the response of the release of the low-consumption mode to the opposing device 3 and sends the notification of the release of low-consumption mode to the DUNP/PANP application (31) via the Bluetooth Profile control unit 32. Thereafter, the transmission/reception of the user data is started.

When the rate is changed to a rate different from the present one according to the amount of traffic at the mobile phones and the instruction from the network side, and when that rate change is completed, the wireless control application 21 notifies the channel (dedicated/common) information to the DUNP/PANP application (31). The DUNP/PANP application (31) calculates the aforesaid maximum rate from the notified channel information and selects the time parameters of the low-consumption mode corresponding to this maximum rate.

When there is no longer data transmitted and received on the Bluetooth, the time parameters of the low-consumption mode found above are used to shift to the low-consumption mode again. These time parameters of the low-consumption mode, particularly the "transmission cycle", finally must be found experimentally in accordance with the service (Profile) to be supported. An example of the basic concept behind this will be shown next.

Where flow control is carried out at the R point, PPP (Point-to-Point Protocol) data of 1500 bytes is transmitted from the DT side. The mobile terminal 2M side (wireless control application 21 or wireless control task 22) divides that data into sections each having the PDU size for the transmission of the data at the U point. When there is only 1 PDU of buffering of the PPP data on the mobile terminal 2M side, flow occurs at the R point when the 1 PPP data is received. When the flow occurs on the mobile terminal 2M side, a signal for notifying the flow is transmitted to the opposing device 3 at the R point. After transmitting this signal, at the R point, the operation mode shifts to the low-consumption mode. If the user rate at this time is 64 kbps, the time required for transmitting the data of 1500 bytes, at the U point, becomes as follows.

1500 (bytes)×8 (bits)/320 (bits)/4 (Blocks)×20 (ms)= 187.5 ms

After the completion of the data transmission to the U point (187.5 ms), in order to notify the release of the flow state at the R point, an attempt is made to send a signal for notifying the flow release to the opposing device 3 at the R point. At this time, the low-consumption mode has been shifted to, at the R point, therefore, in order to transmit this signal, the low-consumption mode is released. Accordingly, the reference value of the cycle of the low-consumption mode can be calculated from the buffer amount of the PPP data which can be prepared on the mobile terminal 2M side and the time required for transmitting the data to the U point. For example, if the buffer amount which can be prepared on the mobile terminal 2M side is 4 PDU, the transition cycle to the low-consumption mode becomes 750 ms.

When flow control is not carried out at the R point, in communications with the downlink, the wireless control task 22 or wireless control application 21 transfers the PDU to the DUNP/PANP application (31) when assembly of the PPP data is completed. The time required for the assembly of 1 PDU is the 187.5 ms found in the above equation when the user rate at the U point is 64 kbps. On the other hand, when the user rate at the U point is 387.2 kbps, the time required for the transfer of 1500 bytes becomes as follows.

$$1500 \text{ (bytes)} \times 8 \text{ (bits)}/387.2 \text{ k(bps)} \approx 31 \text{ ms}$$

That is, the time up to when the transmission of the next data becomes possible is about 150 ($\approx$187.5-31) ms, therefore the value obtained by subtracting the time consumed for the release of the low-consumption mode from the above time can be set as the reference value for obtaining the optimum value of the cycle of the low-consumption mode.

According to the above operation, at the middle speed user rate, by changing the time parameters of the low-consumption mode, it becomes possible to achieve both a shift to the Bluetooth low-consumption mode and the required throughput.

Here, when focusing attention to the dedicated physical channel and the common physical channel explained before, the Bluetooth low-consumption mode control unit 14 can perform control so that (a) when a call established in long distance wireless communications (6) with a third party device 4 uses the dedicated physical channel and the close distance wireless communications (5) with the opposing device 3 has shifted to the low-consumption mode, this low-consumption mode is returned to the normal mode, while (b) when the above-explained established call uses a common physical channel, the low-consumption mode is shifted to immediately after there is no longer data being communicated.

Further, in the above-described (a), even when the processing of the data being communicated ends, the shift to the low-consumption mode is prevented.

Furthermore, in the above-described (a), when there is a request to shift to the low-consumption mode by the opposing device 3, this is rejected.

In a case where only a single call is supported as in a mobile phone and a case where a multi-call is supported, but there is no call other than the calls operating in the DUNP/PANP, the dedicated physical channel is frequently used at the U point if a high throughput is needed. Conversely, if a high throughput is not needed, the common physical channel is frequently used at the U point. In this way, when two types of rates, that is, the high speed (middle speed) user rate and low speed user rate, are supported, the following control can be considered. At the time of use of the dedicated physical channel, importance is attached to the throughput, so the low-consumption mode is not applied, while when the common physical channel is used, the low-consumption mode is given a high priority without attaching importance to the throughput. When the physical channel is established, either of the wireless control application 21 or the wireless control task 22 transfers the information of that physical channel to the Bluetooth Profile application group 31. Hereinafter, when the dedicated physical channel is changed to the common physical channel, during the period until that physical channel is released, the channel information is transferred to the Bluetooth Profile application group 31. Conversely, when the common physical channel is changed to the dedicated physical channel, the information of the dedicated physical channel is transferred to the Bluetooth Profile application group 31 as well. When the call being established in the DUNP/PANP uses the dedicated physical channel and the Bluetooth low-consumption mode is shifted to, the Bluetooth Profile application group 31 operates to return from the low-consumption mode to the normal mode. Further, even when the processing of the data being transmitted/received ends, it performs controls so as not to shift to the low-consumption mode. Further, it rejects any low-consumption mode request from the opposing Bluetooth device (3). On the other hand, when the common physical channel is used, it performs controls so as to shift to the Bluetooth low-consumption mode immediately after when there is no data being transmitted/received.

Note that at a speed not requiring a high throughput so much, that is, the middle speed user rate, and when applying the low-consumption mode of Bluetooth, the user rate of the dedicated physical channel is changed at the U point. In this case, the aforesaid control based on a simple judgment such that whether to use the dedicated physical channel or common physical channel, cannot be applied.

Though depending to the communications system of the mobile phone, in the case of a multi-call, for example, voice speech and packet communications, the two services are mapped on the same dedicated physical channel, therefore the aforesaid method based on the judgment by just the difference of dedicated/common channels cannot be used. Therefore, in addition to the information concerning the physical channel, information relating to the layer 2 is notified to the Bluetooth Profile application group 31. If doing this, it is possible to judge the present user rate from the information of the layer 2.

The above-described Bluetooth Profile application group 31 receives the physical channel information from the wireless control application 21 or the wireless control task 22 and the information concerning the layer 2 described before and then judges the current user rate of the packets. From the user rate judged in the application group 31, the time parameter of the low-consumption mode corresponding to that user rate is selected and that time parameter is applied at the time of the transition to the low-consumption mode.

The low-consumption mode time parameter at the middle speed user rate makes the delay due to the return time from the low-consumption mode small and secures a high throughput by setting the time parameter corresponding to the cycle in each low-consumption mode at a short value.

(iii) Finally, the mode of realizing the optimum low-consumption mode under the Generic Object Exchange (hereinafter referred to as the GOEP) will be explained. In this mode, the Bluetooth low-consumption mode control unit 14 authorizes or prohibits the shift to the low-consumption mode in accordance with whether the data transfer with the opposing device 3 is a single-data transfer mode having a small amount of data amount or an all-data transfer mode having a large amount of data, respectively.

In this case, the Bluetooth low-consumption mode control unit 14 starts the shift to the low-consumption mode when the above-described all-data transfer mode ends.

Figure 14:
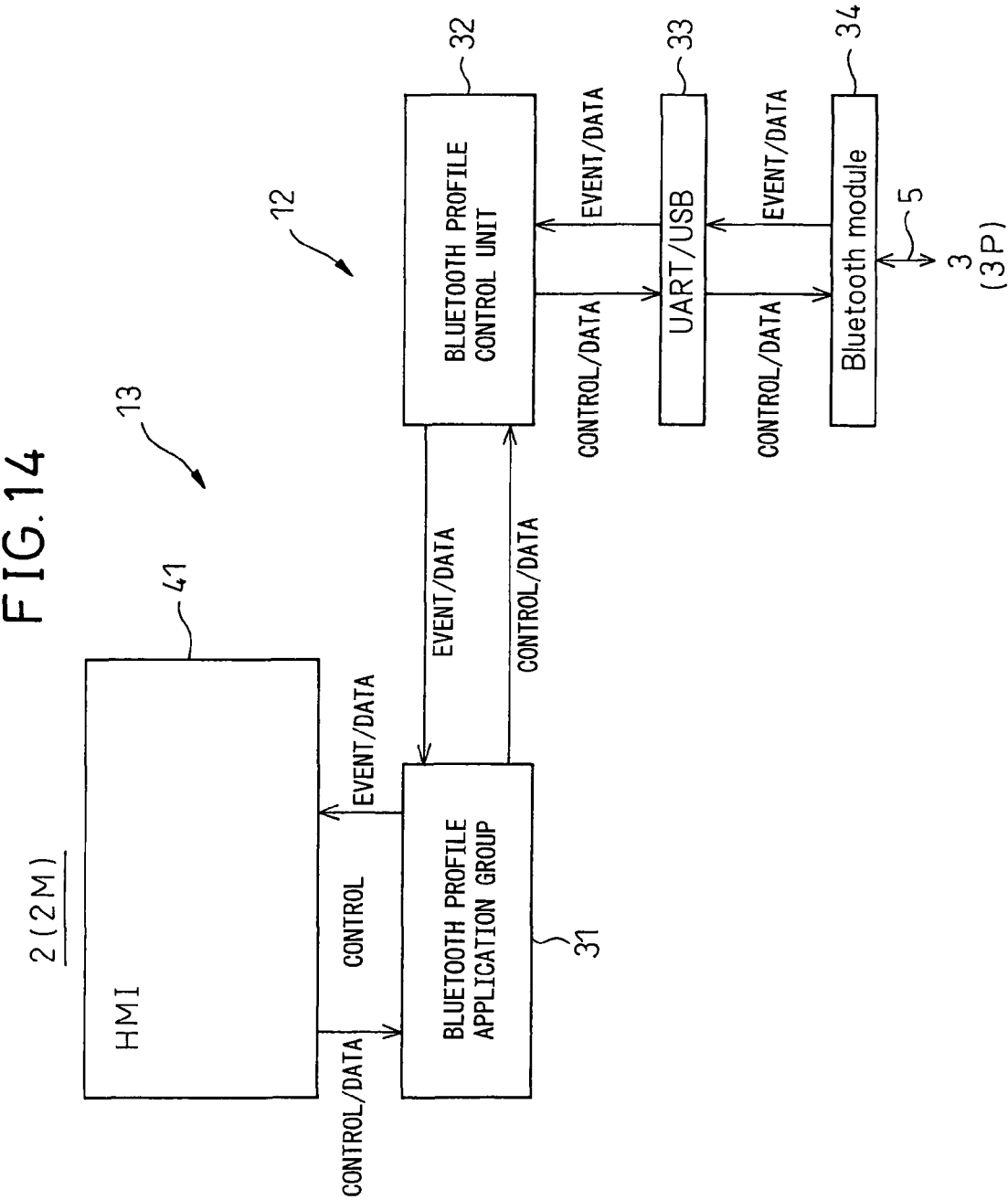
FIG. 14 is a view showing an embodiment of a wireless communications device mainly controlling the low-consumption mode under a GOEP.

FIG. 14 is a view showing an embodiment of a wireless communications device 2 mainly controlling the low-consumption mode under the GOEP mode. The configuration of the figure corresponds to the configuration shown in FIG. 10 minus the portion of the wireless control function unit 11 not directly concerned with the above mode (iii). In this mode (iii), for example, according to the state of the user interface and the result of analysis of the Object Exchange (hereinafter referred to as OBEX) protocol message, it is possible to specify the amount of data transfer and judge whether to request single-data transfer or request all-data transfer so as to control the shift/release of the low-consumption mode.

In general, in the GOEP, in the case of a single PUT (write request)/GET (read request) operation, execution of the Bluetooth low-consumption mode may always be selected. However, when a personal computer 3P backs up the memory and mail of a mobile phone (2M) or when a model is being changed and a sales outlet transfers the stored numbers and the mail of the previously used model to the newly purchased model, a long time is consumed for the shift/release operation of the low-consumption mode and considerable time is taken for the transfer of all of the data.

After the link of Bluetooth is established, when a session is established by the above-described OBEX protocol and a request of PUT/GET of all of the data arrives from the opposing device 3 or when a menu operation relating to GOEP is carried out at the mobile phone (2M) and it is judged that the operation is a PUT operation of all of the data or a GET operation of all of the data, the fact of being an all-data transfer operation is notified from the OBEX data control unit (not shown) to the Bluetooth Profile application group 31. The Bluetooth Profile application group 31 receiving this notification does not perform, after that, the operation to shift to the Bluetooth low-consumption mode. By doing this, the operation to shift to the Bluetooth low-consumption mode is no longer performed, therefore the transfer time can be shortened.

Contrary to this, when just one-data transfer is requested, the above-described OBEX data control unit notifies the Bluetooth Profile application group 31 of the fact that not being an all-data transfer operation. The Bluetooth Profile application group 31 receiving this notification executes, after that, the operation to shift to the Bluetooth low-consumption mode whenever it confirms that there is no data being transmitted/received. Below, an explanation will be given of the actual operation sequence with the use of an example.

Figure 15:
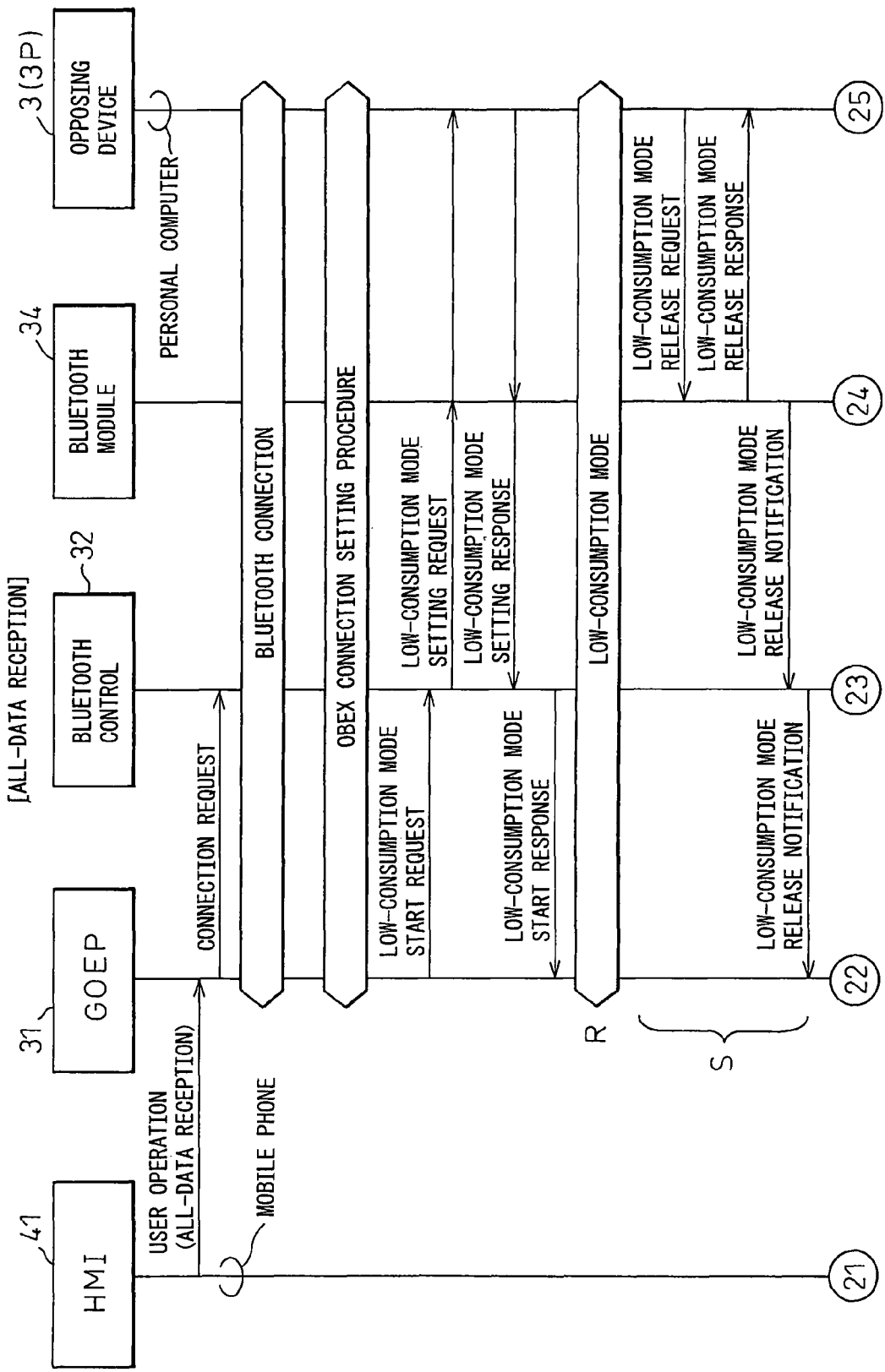
FIG. 15 is a sequence diagram showing a low-consumption mode processing at the time of all-data reception under a GOEP (first).
Figure 16:
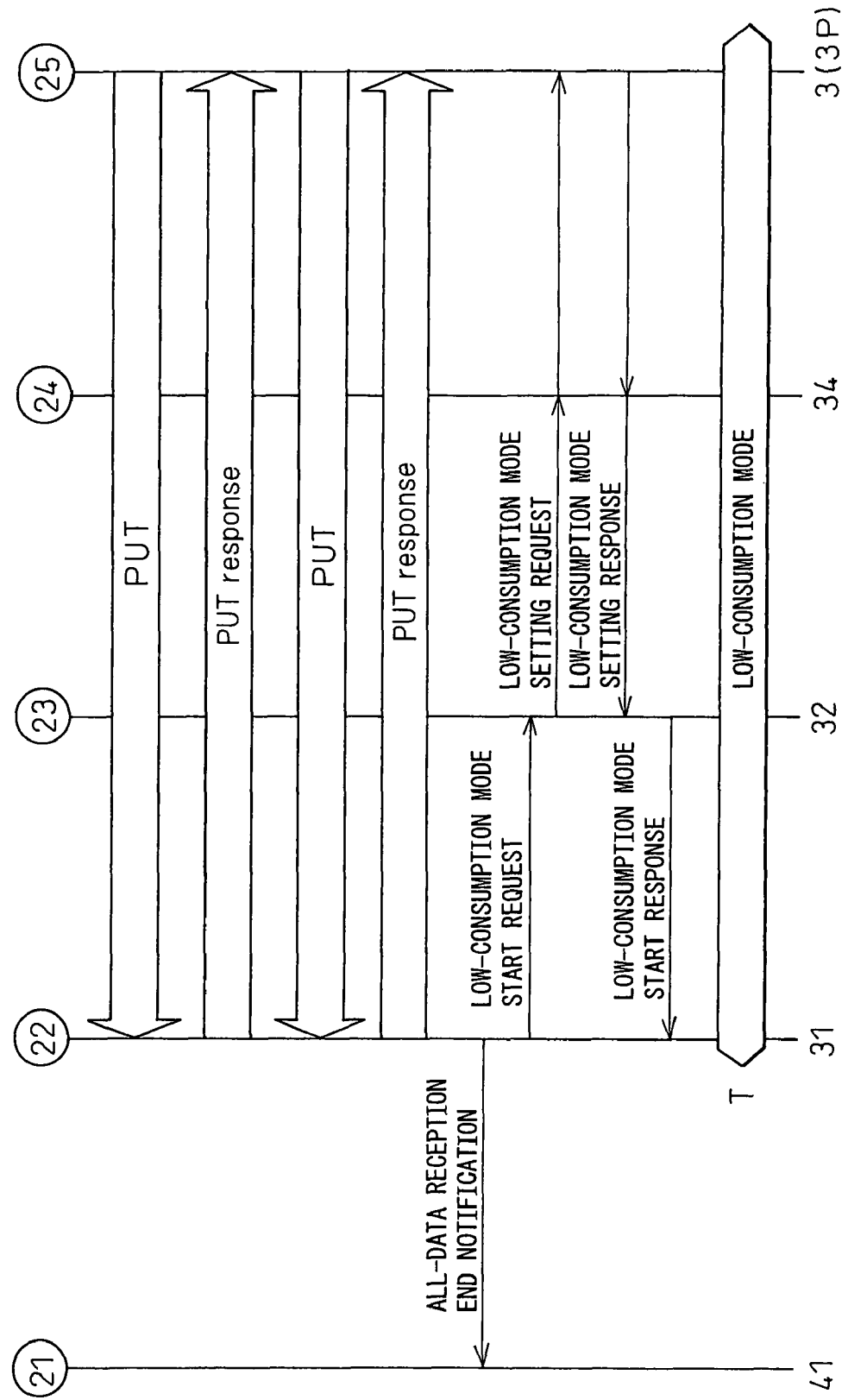
FIG. 16 is a sequence diagram showing a low-consumption mode processing at the time of all-data reception under a GOEP (second).
Figure 17:
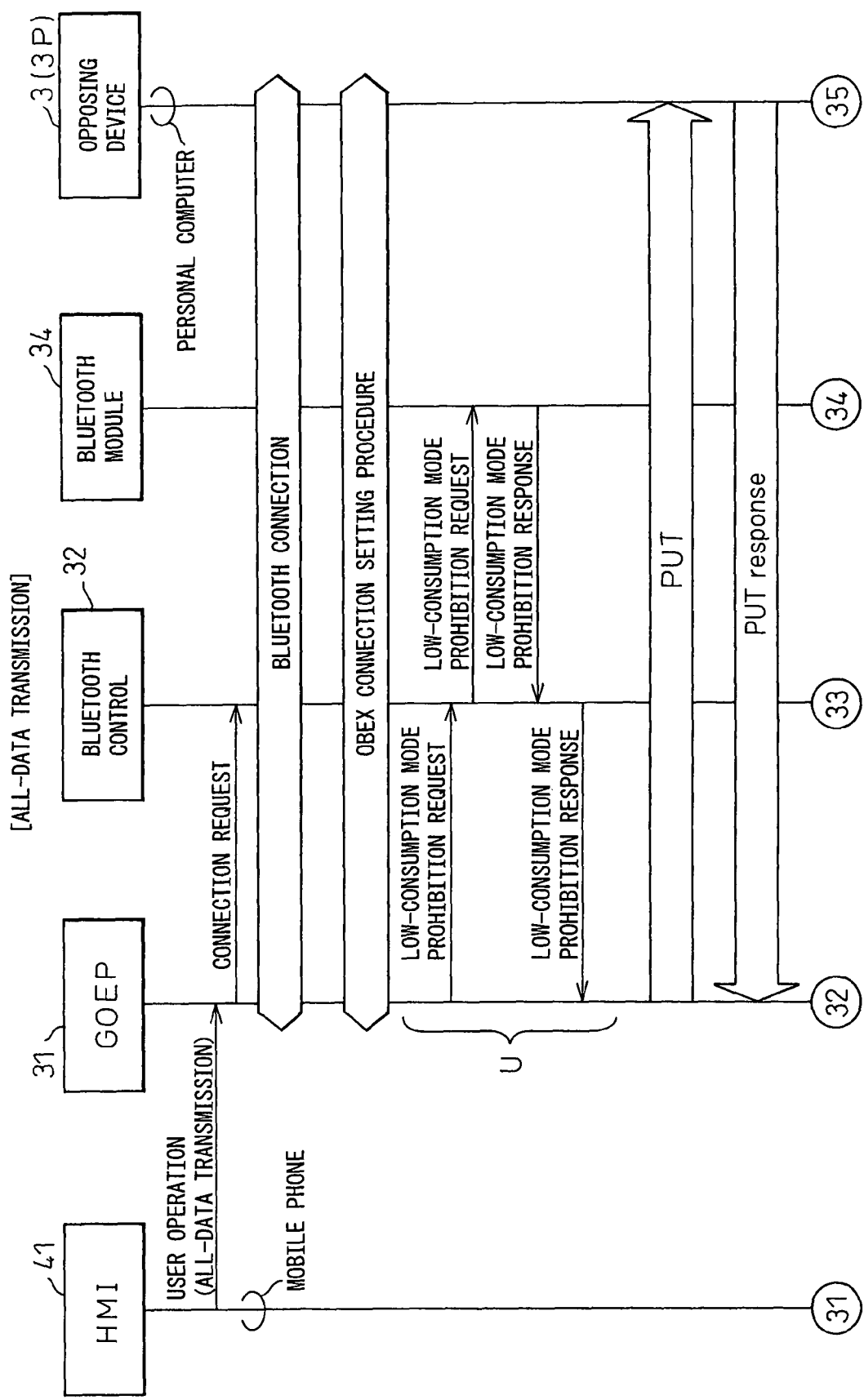
FIG. 17 is a sequence diagram showing a low-consumption mode processing at the time of all-data transmission under a GOEP (first).
Figure 18:
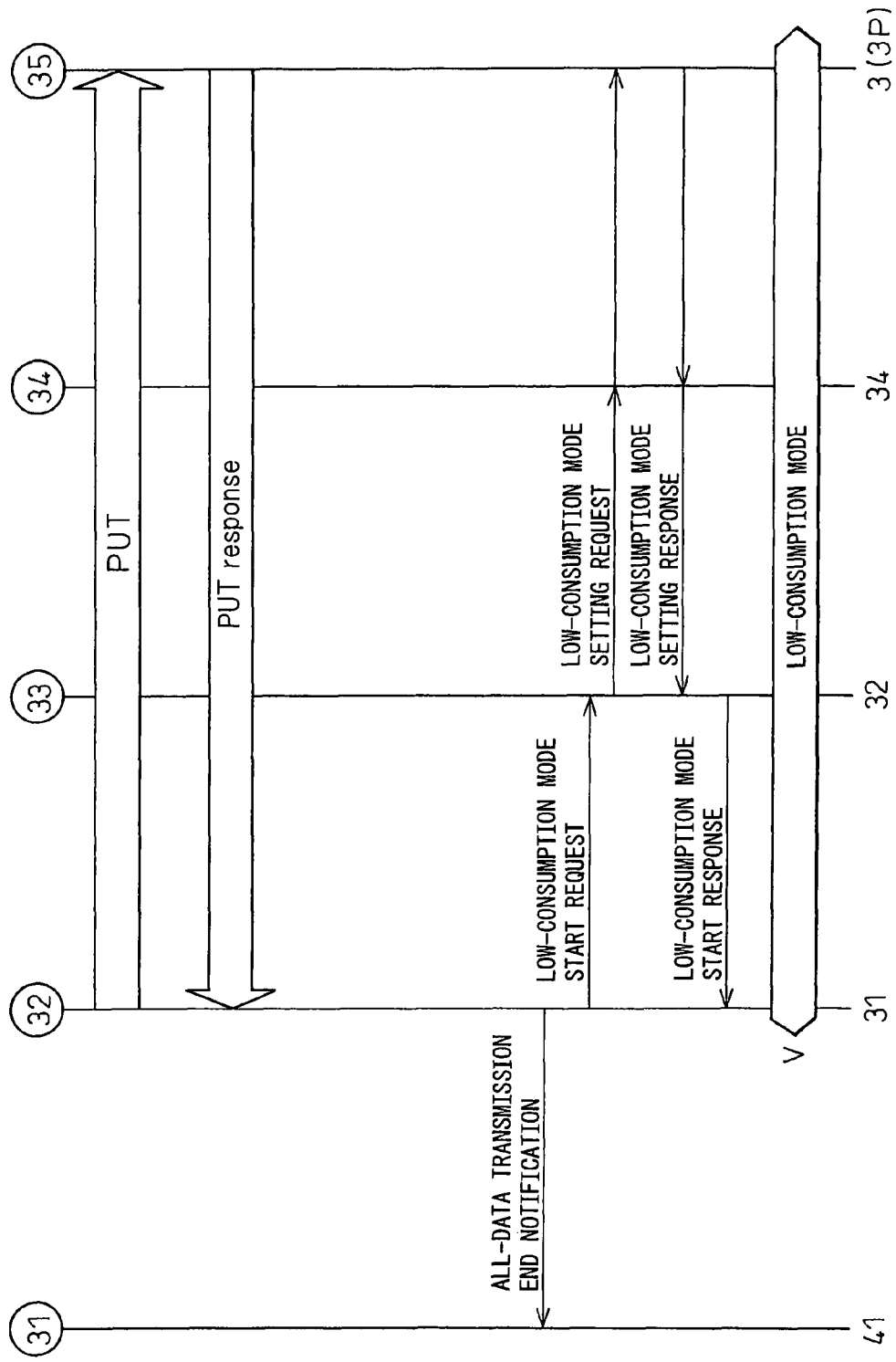
FIG. 18 is a sequence diagram showing a low-consumption mode processing at the time of all-data transmission under the GOEP (second).
Figure 19:
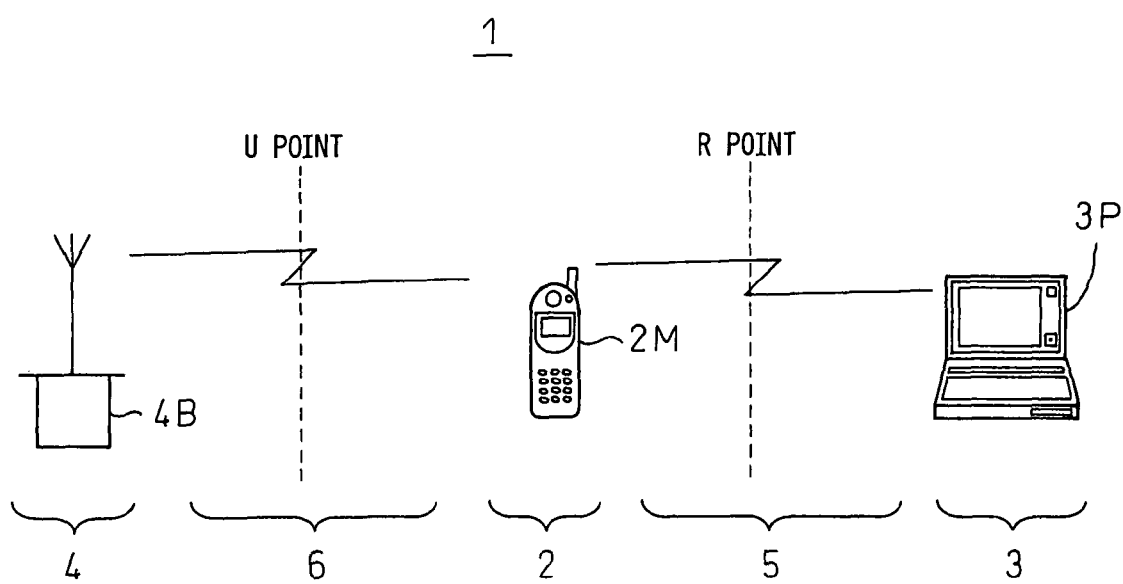
FIG. 19 is a diagram showing an example of a wireless communications system to which the present invention can be applied.

FIG. 15 is a sequence diagram showing the low-consumption mode processing when the 2M of FIG. 14 receives all data from the 3P under the GOEP (first part), FIG. 16 is a diagram of the same (second part), FIG. 17 is a sequence diagram showing the low-consumption mode processing when transmitting all data from the 2M to 3P in FIG. 14 under the GOEP (first part), and FIG. 18 is a diagram of same (second part).

Referring to FIG. 15 and FIG. 16 first, in summary, when a mobile phone receives data from a personal computer, the low-consumption mode is entered once (R of FIG. 15), but when it is identified that this is all of the data, the low-consumption mode is immediately released (S of FIG. 15). When all of the data finishes being received, the low-consumption mode is immediately entered (T of FIG. 16).

On the other hand, referring to FIG. 17 and FIG. 18, in summary, the mobile phone tries to transmit the data to the personal computer, but it identified by itself that this is all of the data, therefore immediately prohibits the low-consumption mode (U of FIG. 17). After that, when all of the data finishes being transmitted, the low-consumption mode is immediately entered (V of FIG. 18). Below, this will be explained in a little more detail.

When receiving all of the data (FIG. 15 and FIG. 16), the setting (setting of the all-data transfer) is transmitted to the GOEP application by the user operation so that mode is shifted to. The GOEP application (31) performs the "connection" (or sets "standby") when there is no Bluetooth connection. When this Bluetooth connection is completed, it enters into the operation for establishing the OBEX connection.

Note that at the time of the operation of this GOEP application, as a default, it operates as the "low-consumption mode". When the OBEX connection is established here, the GOEP application (31) transmits the start request of the low-consumption mode to the Bluetooth Profile control unit 32.

After the above low-consumption mode is started, if transmission data is generated from the opposing device 3 (3P), the low-consumption mode is released by this and the first PUT message is received. The GOEP application (31) judges from the information of the received PUT message whether a file name is designated as the transfer data to be PUT or a path (directory) is designated. If a path is designated as that transfer data, it judges that the transfer is for all data and prohibits the shift to the low-consumption mode until that PUT operation is completed. On the other hand, if a file name is designated as that transfer data, it judges that the transfer is for one-data and transfers a start request of the low-consumption mode to the Bluetooth Profile control unit 32 immediately after the transmission of the PUT response.

When transmitting all data (FIG. 17 and FIG. 18), after the Bluetooth connection is completed and the OBEX connection finishes being established, the GOEP application (31) transmits a request for prohibition of the low-consumption mode to the Bluetooth Profile control unit 32. The Bluetooth Profile control unit 32 sends a low-consumption mode prohibition request for prohibiting the shift to the low-consumption mode to the Bluetooth module 34 in the same way as above. Due to this, a request for shift to the low-consumption mode from the opposing device 3 (3P) can be rejected.

The Bluetooth Profile control unit 32 receiving a low-consumption mode prohibition response from the Bluetooth module 34 sends the low-consumption mode prohibition response to the GOEP application (31). The GOEP application (31) starts the transmission of all data by the reception of that low-consumption mode prohibition response. During this, the mobile terminal (mobile phone) 2M and the opposing device (personal computer 3P) do not shift to the Bluetooth low-consumption mode.

When all data finishes being transmitted, the GOEP application (31) transmits the start request of the low-consumption mode to the Bluetooth Profile control unit 32 in order to authorize the shift to the low-consumption mode. Further, the Bluetooth Profile control unit 32 transmits a setting request of the low-consumption mode to the Bluetooth module 34. Upon receipt of the acknowledge response from the opposing device (3P), the Bluetooth module 34 transmits a response of setting the low-consumption mode to the Bluetooth Profile control unit 32. Due to this, the Bluetooth Profile control unit 32 reports the start of the low-consumption mode to the GOEP application (31) and both the mobile terminal (mobile phone) 2M and the opposing device (personal computer) shift to the low-consumption mode.

Due to the above operation, in all-data transmission/all-data reception of the GOEP, the data transfer operation can be completed in a short time. Note that in the case of one-data transmission, the low-consumption mode is shifted to immediately after the completion of the data transmission.

As explained in detail above, according to the present invention, it becomes possible to execute the "low-consumption mode" defined in the Bluetooth specifications in the optimum mode in accordance with the characteristics of various types of services (profiles) provided under Bluetooth.

The invention claimed is:

1. A wireless communications device comprising a wireless control function unit for wireless communications with a third party device via a first wireless communications section, a Bluetooth control function unit for wireless communications according to Bluetooth with an opposing device via a second wireless communications section different from the first wireless communications section, and a user interface unit linked with the wireless control function unit and Bluetooth control function unit, said Bluetooth control function unit including at least a Hands-Free Profile as the Bluetooth Profile, said wireless communications device characterized in that said Bluetooth control function unit includes a Bluetooth low-consumption mode control unit, which Bluetooth low-consumption mode control unit sets a timing for transmitting reception level information of an electric wave through the first wireless communications section in said wireless communications to said opposing device so that the number of transmissions per unit time becomes small.

2. A wireless communications device as set forth in claim 1, wherein when said wireless control function unit performs said wireless communications with said third party device according to intermittent reception, said Bluetooth low-consumption mode control unit sets a timing for transmitting said reception level information to said opposing device so as to be synchronized with the intermittent reception timing.

3. A wireless communications device as set forth in claim 2, wherein said Bluetooth low-consumption mode control unit has a storing means for storing said reception level information which is already transmitted previously and a comparing means for comparing the reception level information to be transmitted this time and said stored reception level information and transmits the reception level information only when a change occurs between the two as a result of the comparison.

4. A wireless communications device comprising a wireless control function unit for wireless communications with a third party device, a Bluetooth control function unit for wireless communications according to Bluetooth with an opposing device, and a user interface unit linked with these wireless control function unit and Bluetooth control function unit, said Bluetooth control function unit including, as the Bluetooth profiles, at least a Dial-up Networking Profile or a Personal Area Network Profile, said wireless communications device characterized in that said Bluetooth control function unit includes a Bluetooth low-consumption mode control unit with either of a Hold mode, a Sniff mode, and a Park mode, which Bluetooth low-consumption mode control unit (a) determines whether to validate or invalidate the low-consumption mode in accordance with the user rate when performing said wireless communications with said third party device and (b) when validating the low-consumption mode further makes the time parameters in the corresponding mode changeable.

5. A wireless communications device as set forth in claim 4, wherein when said Bluetooth control function unit executes the Hold mode, said Bluetooth low-consumption mode control unit sets said time parameters in (b) to a hold time of the Hold mode.

6. A wireless communications device as set forth in claim 4, wherein when said Bluetooth control function unit executes the Sniff mode, said Bluetooth low-consumption mode control unit sets said time parameter in (b) to a low-consumption slot transmission cycle of the Sniff mode.

7. A wireless communications device as set forth in claim 6, wherein a transmission/reception interval for maintaining the synchronization in the Sniff mode is made changeable in accordance with the changeable low-consumption slot transmission cycle of the Sniff mode.

8. A wireless communications device as set forth in claim 4, wherein when said Bluetooth control function unit executes the Park mode, said Bluetooth low-consumption mode control unit sets said time parameter in (b) to a cycle of synchronous correction in the Park mode.

9. A wireless communications device comprising a wireless control function unit for wireless communications with a third party device, a Bluetooth control function unit for wireless communications according to Bluetooth with an opposing device, and a user interface unit linked with these wireless control function unit and Bluetooth control function unit, said Bluetooth control function unit including, as the Bluetooth profiles, at least a Dial-up Networking Profile or a Personal Area Profile, said wireless communications device characterized in that said Bluetooth low-consumption mode control unit
(a) returns from a low-consumption mode to a normal mode when (i) a call established, in said wireless communications, with said third party device uses a dedicated physical channel and (ii) said wireless communications with the opposing device shifts to the low-consumption mode and
(b) shifts to said low-consumption mode immediately after the data being communicated runs out when the above established call uses a common physical channel.

10. A wireless communications device as set forth in claim 9, wherein, in (a), even when the processing of the data being communicated ends, the shift to said low-consumption mode is prevented.

11. A wireless communications device as set forth in claim 10, wherein, in (a), when there is a request to shift to said low-consumption mode from said opposing device, this is rejected.

12. A wireless communications device comprising a wireless control function unit for wireless communications with a third party device, a Bluetooth control function unit for wireless communications according to Bluetooth with an opposing device, and a user interface unit worked with these wireless control function unit and Bluetooth control function unit, said Bluetooth control function unit including at least a Generic Object Exchange Profile as the Bluetooth profile, said wireless communications device characterized in that said Bluetooth control function unit includes a Bluetooth low-consumption mode control unit, which Bluetooth low-consumption mode control unit approves or prohibits a shift to the low-consumption mode according to whether the data transfer with said opposing device is a single-data transfer mode having a small amount of data or an all-data transfer mode having a large amount of data, respectively.

13. A wireless communications device as set forth in claim 12, wherein the Bluetooth low-consumption mode control unit starts the shift to said low-consumption mode when said all-data transfer mode ends.

* * * * *